US012744742B2

(12) United States Patent
Tourrilhes et al.

(10) Patent No.: US 12,744,742 B2

(45) Date of Patent: Sep. 22, 2026

(54) NO EMPTY AND INITIAL ADVANCE FOR SELF-CLOCKED ROUND ROBIN SCHEDULER

(71) Applicant: Hewlett Packard Enterprise Development LP, Spring, TX (US)

(72) Inventors: Jean Tourrilhes, Mountain View, CA (US); Puneet Sharma, Palo Alto, CA (US)

(73) Assignee: Hewlett Packard Enterprise Development LP, Spring, TX (US)

(*) Notice: Subject to any disclaimer, the term of this patent is extended or adjusted under 35 U.S.C. 154(b) by 103 days.

(21) Appl. No.: 18/661,348

(22) Filed: May 10, 2024

(65) Prior Publication Data

US 2025/0350566 A1 Nov. 13, 2025

(51) Int. Cl.
*H04L 47/62* (2022.01)
*H04L 47/28* (2022.01)

(52) U.S. Cl.
CPC .......... *H04L 47/6225* (2013.01); *H04L 47/28* (2013.01)

(58) Field of Classification Search
CPC ... H04L 47/50; H04L 47/2441; H04L 47/623; H04L 49/90; H04L 47/6215; H04L 47/621; H04L 47/6255; H04L 47/56; H04L 49/205; H04L 47/2433; H04L 47/24; H04L 49/254; H04L 47/22; H04L 47/2408; H04L 47/527; H04L 47/568; H04L 49/3027; H04L 47/10; H04L 47/522; H04L 49/506; H04L 2012/5679; H04L 47/6275; H04L 2012/5681; H04L 47/20; H04L 47/564; H04L 47/60; H04L 49/101; H04L 49/109; H04L 47/21; H04L 47/215; H04L 47/32; H04L 49/9023; H04L 47/125; H04L 47/2416; H04L 47/28; H04L 47/525; H04L 47/627; H04L 67/62; H04L 12/1439; H04L 12/5601; H04L 47/39; H04L 49/3018;
(Continued)

(56) References Cited

U.S. PATENT DOCUMENTS

2002/0036984 A1* 3/2002 Chiussi ............... H04L 12/5602 370/232
2004/0170186 A1* 9/2004 Shao ..................... H04L 47/283 370/413
(Continued)

*Primary Examiner* — Djenane M Bayard
(74) *Attorney, Agent, or Firm* — Hewlett Packard Enterprise Patent Department

(57) ABSTRACT

A system maintains sub-queues used for storing packets. A respective packet is enqueued into a sub-queue and dequeued by a scheduler. A virtual time associated with the respective packet is based on a current sub-queue virtual time corresponding to a previously enqueued packet in the sub-queue. The scheduler tracks a global virtual time based on dequeuing packets from the sub-queues and by advancing the global virtual time in response to completing a scheduling round. The system inserts a packet into a sub-queue which is previously empty. In response to a virtual time associated with the sub-queue being earlier than or equal to the current global virtual time, the system schedules the sub-queue before the non-empty sub-queues. In response to the virtual time associated with the sub-queue being later than the current global virtual time, the system schedules the sub-queue for forwarding packets after the non-empty sub-queues.

19 Claims, 9 Drawing Sheets

(58) Field of Classification Search
CPC . H04L 69/22; H04L 2012/5651; H04L 47/11; H04L 47/266; H04L 47/283; H04L 49/103; H04L 49/901; H04L 47/30; H04L 49/30; H04L 47/824; H04L 47/29; H04L 49/3009; H04L 47/15; H04L 12/6418; H04L 47/562; H04L 49/503; H04L 49/3081; H04L 47/629; H04L 2012/5649
See application file for complete search history.

(56) References Cited

U.S. PATENT DOCUMENTS

| | | | | |
|---|---|---|---|---|
| 2005/0220115 | A1* | 10/2005 | Romano | H04L 49/90<br>370/412 |
| 2005/0243847 | A1* | 11/2005 | Bitar | H04L 47/527<br>370/412 |
| 2011/0158203 | A1* | 6/2011 | Biton | H04W 72/535<br>370/336 |

* cited by examiner

COMPUTER-READABLE MEDIUM
800

INSTRUCTIONS TO MAINTAIN A QUEUE STRUCTURE COMPRISING SUB-QUEUES USED FOR STORING PACKETS TO BE FORWARDED
810

INSTRUCTIONS TO TRACK A GLOBAL VIRTUAL TIME BASED ON DEQUEUING PACKETS FROM THE SUB-QUEUES
812

INSTRUCTIONS TO IDENTIFY ONE OR MORE NON-EMPTY SUB-QUEUES
814

INSTRUCTIONS TO INSERT A PACKET INTO A FIRST SUB-QUEUE WHICH HAS BEEN PREVIOUSLY EMPTY
816

INSTRUCTIONS TO DETERMINE THAT A VIRTUAL TIME ASSOCIATED WITH THE FIRST SUB-QUEUE IS EARLIER THAN OR EQUAL TO THE CURRENT GLOBAL VIRTUAL TIME
818

INSTRUCTIONS TO SCHEDULE THE FIRST SUB-QUEUE FOR FORWARDING PACKETS BEFORE THE NON-EMPTY SUB-QUEUES IN RESPONSE TO AT LEAST ONE CONDITION
820

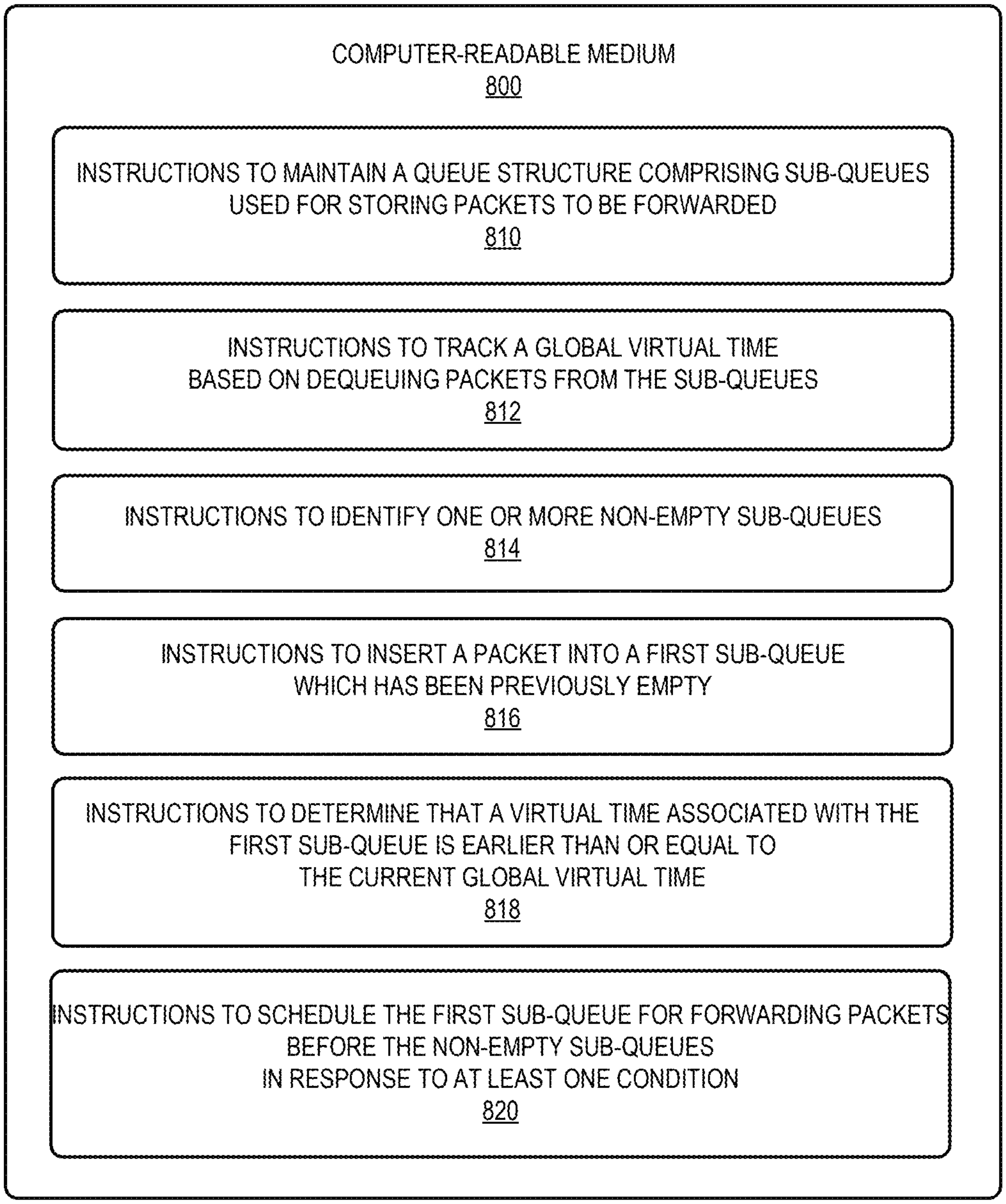

FIG. 8

NO EMPTY AND INITIAL ADVANCE FOR SELF-CLOCKED ROUND ROBIN SCHEDULER

BACKGROUND

Field

Multiple streams of data may be merged onto the same network link, requiring schedulers to control how packets of various streams may be merged in order to provide fairness or Quality of Service (QOS) between users of the network link. "Fair Queuing" (FQ) schedulers can offer the best fairness, but may incur high computational complexity. As a result, most schedulers use a variation of "Deficit Round Robin" (DRR), which has a much lower computational complexity and is based on a "quantum" as a fixed unit of scheduling which constrains the granularity of the fairness. "Self-Clocked Round Robin" (SCRR) is a scheduler which enqueues packets into sub-queues and computes a packet virtual time (similar to FQ), but dequeues packets in a round-robin manner without visiting or reordering all the sub-queues and without using a quantum. SCCR uses a virtual clock for scheduling packets. Sparse Flow Optimization (SFO) can be an enhancement of SCRR. In SCRR with SFO, sub-queues that were previously idle (i.e., empty) may be eligible for immediate scheduling, but may result in "empty visits," where the scheduler visits a sub-queue which is empty. Furthermore, in SCRR, adding a previously empty sub-queue to a scheduling round can be limited by sending only a single packet from the previously empty sub-queue.

BRIEF DESCRIPTION OF THE FIGURES

FIG. 8 illustrates a computer-readable storage medium which facilitates handling previously empty sub-queues in an SCRR scheduler, in accordance with an aspect of the present application.

In the figures, like reference numerals refer to the same figure elements.

DETAILED DESCRIPTION

Figure 1:
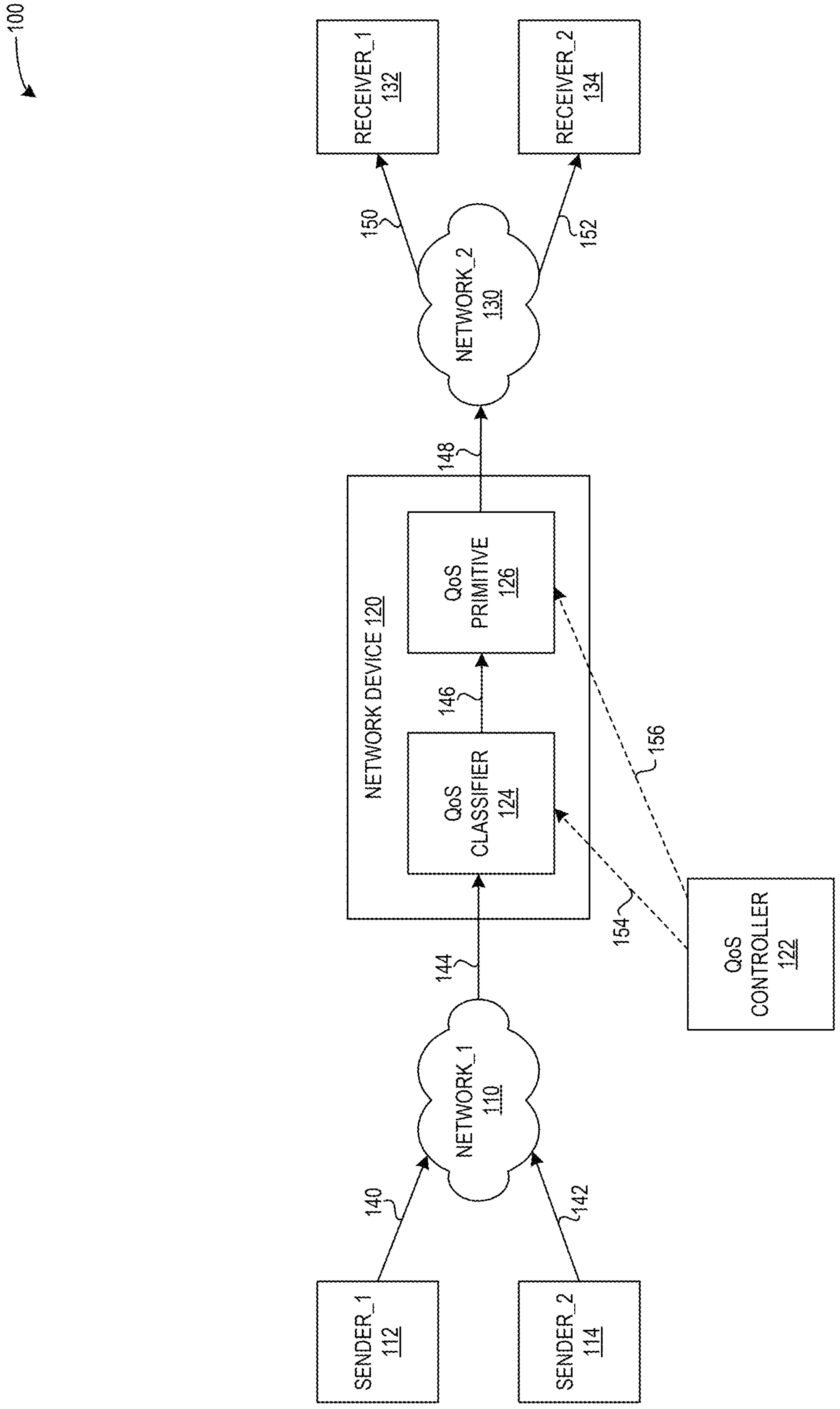
FIG. 1 illustrates an environment which includes a Quality of Service (QOS) controller for scheduling packets, in accordance with an aspect of the present application.

Aspects of the instant application use the virtual clock of a self-clocked round robin (SCRR) scheduler to eliminate wasteful "empty visits" of previously empty sub-queues and to enable a sub-queue which was previously empty to forward more than a single packet in the current scheduling round.

Multiple streams of data may be merged onto the same network link, requiring schedulers to control how packets of various streams may be merged in order to provide fairness or Quality of Service between users of the network link. "Fair Queuing" (FQ) schedulers can offer the best fairness, but may incur high computational complexity. As a result, most schedulers use a variation of "Deficit Round Robin" (DRR), which has a much lower computational complexity and is based on a "quantum" as a fixed unit of scheduling which constrains the granularity of the fairness. "Self-Clocked Round Robin" (SCRR) is a scheduler which enqueues packets into sub-queues and computes a packet virtual time (similar to FQ), but dequeues packets in a round-robin manner without visiting or reordering all the sub-queues and without using a quantum. SCCR uses a virtual clock for scheduling packets.

SCRR can implement Sparse Flow Optimization (SFO), which is a technique that can lower the latency of typical latency-sensitive applications. Using SFO, a sub-queue which was previously empty can be eligible for immediate scheduling. However, SFO may result in "empty visits," in which the scheduler visits a sub-queue which is empty. The unpredictable nature of empty visits can affect hardware processing and can also add noticeable software CPU overhead. Furthermore, in SCRR, a sub-queue which was previously empty may be added to the current scheduling round but is limited to sending only one packet. In comparison, in DRR, a sub-queue that was previously empty can forward a full quanta, i.e., a number of bytes equal to the other sub-queues where the number of bytes can include multiple packets. Forwarding more than a single packet at once from a previously empty sub-queue can result in improved performance for latency-sensitive applications.

Aspects of the instant application address the empty visits resulting from SFO by using a technique referred to as "No Empty for SCRR" (or "No Empty"). In order to eliminate empty visits, empty sub-queues can be entirely removed from the schedule. When a previously empty sub-queue needs to be added to the schedule, No Empty can test a virtual time of that sub-queue against the global virtual clock to determine whether that sub-queue is eligible for immediate scheduling. The described aspects include a technique referred to as "Initial Advance for SCRR" (or "Initial Advance"), which enables sub-queues that were previously idle (i.e., empty) to forward in the current scheduling round a number of bytes equal to the other sub-queues.

The SCRR scheduler can incur a computational complexity similar to DRR schedulers and much lower than FQ schedulers. Specifically, the SCRR scheduler can enqueue packets into sub-queues and compute a packet virtual time (similar to FQ), but can dequeue packets in a round robin (RR) manner without looking at all sub-queues for each packet or without having to reorder the sub-queues and without using a quantum. The SCRR scheduler can track a global virtual time which represents the progress in dequeuing packets, and which is based on the virtual time of the packets dequeued in the last round robin cycle through the sub-queues. The SCRR scheduler can enqueue packets using the concept of a tracked virtual time for each sub-queue. The SCRR scheduler can dequeue packets by performing the following for each sub-queue in RR fashion: dequeue one packet from a sub-queue; and determine whether to dequeue the next packet in the same sub-queue or move to the next sub-queue by comparing a packet virtual time of the next packet with the current global virtual time.

The term "virtual time" can be associated with a packet and can refer to a relative progress or position of the packet in being processed and can be represented as a number of bytes, e.g., time spent in a sub-queue waiting to be dequeued represented as a total number of bytes processed in the sub-queue between the time the packet is enqueued and the time the packet is dequeued. The virtual time can be indicated as a number of bytes based on the size of packets enqueued into a sub-queue and correspondingly dequeued from the sub-queue. The virtual time can be effectively related to the byte count progress in a sub-queue. The terms "virtual time of a packet" and "packet virtual time" are used interchangeably and can be based on the virtual time of the sub-queue associated with the packet at the time the packet was enqueued. The packet virtual time can be a start time or a finish time associated with the packet.

The term "global virtual time" can indicate the progress in dequeuing packets, and which is based on the virtual time of the packets dequeued in the last round robin cycle through the sub-queues. The global virtual time can be increased based on the virtual time of the packets dequeued by the scheduler.

The term "sub-queue virtual time" can indicate a most recently enqueued packet in the given sub-queue. The sub-queue virtual time can be incremented based on the size of the packets enqueued in the sub-queue and the sub-queue weight.

Network Queues, Congestion, Sub-Queues, and Schedulers

Network elements (e.g., routers, switches, etc.) may have multiple network links connected to them. A network element can enable the connection of multiple network links to each other and can also forward incoming traffic to the proper outgoing link. Each link may have a finite outgoing capacity and can transmit only one packet at a time. The traffic to be forwarded on a link may arrive from many links and may be unpredictable or bursty. One current solution to handle the mismatch between these incoming and outgoing properties is to implement a queue on the outgoing interface of each link. The queue can store incoming bursts of traffic, and the outgoing interface can send traffic on the link from the queue at the appropriate pace (usually as fast as the link is capable). Thus, a queue can accommodate a temporary excess in input rate by storing packets and smoothing out the processing at the outgoing link.

Networks may be shared by many network applications, which may use different manners of sharing network resources between the applications. One manner is a "best effort" policy, in which the sharing between applications is not managed and instead is only concerned by the overall efficiency of the network. Another manner is "fairness," which attempts to split some characteristic of the network as equally as possible. Examples of types of fairness may include an equal number of packets, an equal bandwidth, or an equal queuing delay. Yet another manner is network "quality of service" (QOS), which attempts to enforce a QoS policy configured by an administrator of the network. As an example, a QoS policy may define priorities, where applications with higher priority may receive preferential treatment over applications with lower priority. As another example, a QoS policy may limit some of the applications or reserve resources for some of the applications.

In general, most networks can implement a mix of these different manners of sharing network resources between the applications.

As described above, congestion at a queue may occur when the traffic originators sending traffic through a queue are collectively trying to send more traffic than the queue can process and forward. If the queue is not congested, each user can send as much traffic as it wants, in which case neither fairness nor QoS is an issue. However, if the queue is congested, each user may not be able to send as much traffic as it wants, in which case both fairness and QoS may be a concern.

As a result, queue congestion may strongly affect the fairness and QoS of the network as a whole. A simple queue may only provide a best effort service. More complex queues may implement fairness for traffic going through the bottleneck, e.g., by giving various traffic flows equal treatment. Other complex queues may implement and enforce QoS policies amongst QoS classes.

FIG. 1 illustrates an environment 100 which includes a QoS controller 122 for scheduling packets, in accordance with an aspect of the present application. Environment 100 can include multiple network senders which send data to multiple network receivers, where the data may pass through multiple networks and at least one network device. For example, a sender_1 112 and a sender_2 114 can send data (via, respectively, communications 140 and 142) destined for a receiver_1 132 and a receiver_2 134. The data can pass through a network_1 110 to a network device 120 (via a communication 144) and through a network_2 130 (via a communication 148) before being sent onwards to receivers 132 and 134 (via, respectively, communications 150 and 152). Network device 120 can include logic, circuits, elements, units, components, and modules, in hardware or software or a combination, such as a QoS classifier 124 and a QoS primitive 126.

Network device 120 can also include or be associated with a QoS controller 122, which can reside in network device 120 or be accessed or used from a location remote from or external to network device 120. QoS controller 122 can send QoS configurations to both QoS classifier 124 and QoS primitive 126 (via, respectively, communications 154 and 156). QoS classifier 124 can be configured to classify data received from network_1 110 into one of a plurality of classes, where a class can correspond to a certain sub-queue of a plurality of sub-queues. That is, QoS classifier 124 can assign a class to a packet and enqueue the packet into a sub-queue based on the assigned class for the packet. QoS primitive 126 can be configured to dequeue or schedule packets from the sub-queues based on certain policies, including fairness (e.g., an equal number of packets, bytes/bandwidth, and latency for all users) and QoS (e.g., differently allocated bandwidth and latency to users based on priority, percentage, etc.). Congestion may occur in the network device at the point of dequeuing, thus the order in which packets received via 144 are dequeued or scheduled by QoS primitive 126 and subsequently transmitted via 148 can be critical in enforcing fairness and QoS.

One main technique to implement network fairness or network QoS is to use a complex queue structure (e.g., with multiple sub-queues) and a scheduler. The system (or a user) can assign each traffic class or traffic flow to a particular sub-queue. When the queue structure receives a packet, a classifier can select the sub-queue into which to place the packet (e.g., based on packet headers). In the case of First-In-First-Out (FIFO) queues, packets can be enqueued at the tail of a sub-queue. Upon dequeuing, the scheduler can scan the sub-queues and select a sub-queue and the corresponding packet (or packets) at the head of the selected sub-queue. In selecting the sub-queue, the scheduler decides the order in which packets are processed and forwarded. The scheduler can ensure that each traffic class or traffic flow is handled fairly. Given a suitable set of sub-queues, classifier, and scheduler, complex and elaborate QoS policies can be effectively implemented.

Figure 2:
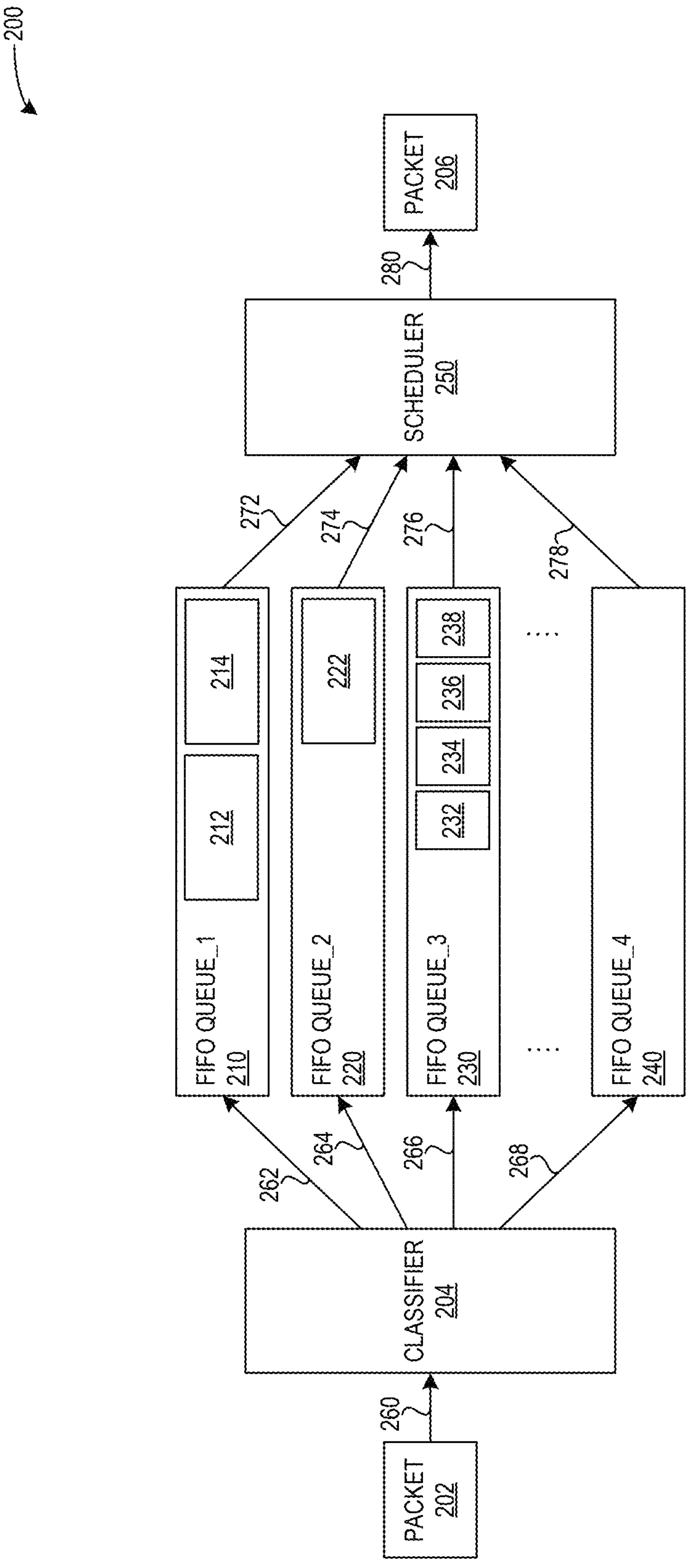
FIG. 2 illustrates an environment which includes a classifier, a plurality of sub-queues, and a scheduler, in accordance with an aspect of the present application.

FIG. 2 illustrates an environment 200 which includes a classifier 204, a plurality of sub-queues 210, 220, 230, and 240, and a scheduler 250, in accordance with an aspect of the present application. Classifier 204, sub-queues 210-240, and scheduler 250 can be part of a network device, e.g., as described above in relation to network device 120 of FIG. 1. Classifier 204 and scheduler 250 can comprise hardware, software, or a combination of hardware and software in the network device which can perform the operations described herein. A queue structure which includes sub-queues 210-240 may be stored in a volatile or non-volatile memory of the network device. The system (or a user) can assign a traffic class or traffic flow to a particular sub-queue. Similar to QoS classifier 124 of FIG. 1, classifier 204 can be configured to classify or assign incoming data (i.e., packets) into one of a plurality of classes, e.g., to a specific sub-queue based on the assigned traffic class or traffic flow. Thus, classifier 204 can assign a class to a packet and enqueue the packet into a sub-queue based on the assigned class for the packet. Sub-queues 210, 220, 230, and 240 can be first in, first out (FIFO) queues, which can be part of a queue structure maintained by the network device. Each queue can be associated with a particular class and include zero or more packets. For example: FIFO queue_1 210 can include at least packets 212 and 214; FIFO queue_2 220 can include at least a packet 222; FIFO queue_3 230 can include at least packets 232, 234, 236, and 238; and FIFO queue_4 240 can include no packets. Environment 200 may include a fewer or greater number of sub-queues than as illustrated in FIG. 2. Network fairness and QoS can be implemented by using a complex queue structure (e.g., with multiple sub-queues such as sub-queues 210-240) and a scheduler (e.g., scheduler 250). Scheduler 250 can scan the sub-queues and select a sub-queue and a packet (or packets) at the head of the selected sub-queue to be dequeued. Thus, scheduler 250 can determine the order in which packets are processed (i.e., dequeued) and forwarded, which can ensure that each traffic class or traffic flow is handled fairly. Examples of schedulers are described below and can include a Round Robin scheduler and a Fair Queuing scheduler and their respective variants. The described aspects can also include a Self-Clocked Round Robin scheduler.

In environment 200, a packet 202 can be received by classifier 204, which can assign a class to packet 202. Packet 202 (along with other assigned packets) can be enqueued at the end (i.e., the tail) of one of sub-queues 210, 220, 230, and 240 (via, respectively, operations 262, 264, 266, and 268) based on the assigned class. Scheduler 250 can determine, based on configured policies to enforce fairness and QoS, an order in which to dequeue the packets of sub-queues 210, 220, 230, and 240 (depicted, respectively, as operations 272, 274, 276, and 278), where the packets are forwarded, e.g., as a packet 206 (via an operation 280).

Thus, environment 200 depicts multiple sub-queues (210, 220, 230, and 240) that store packets which are directed to and enqueued into the sub-queues based on a classification or class assigned by the classifier (204). The scheduler (250) can be responsible for dequeuing the packets stored in the sub-queues, i.e., scheduling the order in which the packets are to be dequeued from the multiple sub-queues.

Round Robin Schedulers

Some network schedulers may be based on the "round robin" principle, in which an equal amount of resource is given in turn and in sequence to each traffic class or traffic flow that is congesting the queue structure. A basic Round Robin (RR) scheduler processes in turn one packet of each non-empty sub-queue. The basic RR scheduler can achieve per-packet fairness, where each traffic flow may have an equal number of packets forwarded over time. In a Weighted Round Robin (WRR) scheduler, different weights may be configured for the sub-queues. The WRR scheduler can process packets of the sub-queues in proportion to those weights and can also use the weights to implement some types of QoS policies.

Deficit Round Robin (DRR) is a round robin scheduler based on the notion of a "quantum." A quantum can represent a number of bytes and is a static, pre-configured value. The DRR scheduler can also keep track of a deficit for each sub-queue. The DRR scheduler can process the sub-queues one after the other, in sequence, and can forward packets from the processed sub-queues. When processing a sub-queue, the DRR scheduler can compute a number of bytes to process by adding the quantum and the sub-queue deficit. The DRR scheduler can subsequently forward as many packets of that sub-queue as allowed based on the computed number of bytes. The unused number of bytes may be stored in the sub-queue as the new deficit. Over time, each congested sub-queue can send the same amount or number of bytes, regardless of packet sizes. Thus, the DRR scheduler can implement per-byte fairness, where each sub-queue is given the same bandwidth. Because the DRR scheduler can process the sub-queues in sequence, the computational complexity of choosing a sub-queue is O(1).

Deficit Weighted Round Robin (DWRR) is a version of the DRR scheduler and uses weights for the sub-queues. When computing the number of bytes, the quantum is multiplied by the weight of the sub-queue.

Fair Queuing Schedulers

As described above, Fair Queuing (FQ) schedulers aim to achieve the best possible latency fairness and bandwidth fairness with the smallest average burstiness. FQ schedulers can emulate the result of a bit-by-bit round robin, while preserving packet boundaries. Compared to the RR schedulers, FQ schedulers can achieve bandwidth fairness. Compared specifically to DRR schedulers, FQ schedulers can implement fairness using the best possible latency fairness and bandwidth fairness with the smallest average burstiness.

The main issue with most FQ schedulers is that packets need to be dequeued in a specific order, which either requires the scheduler to scan multiple sub-queues to find the packet that needs to be scheduled or to reorder sub-queues in that specific order. As a result, the computational complexity of choosing a sub-queue is usually O(log(n)), where n is the number of sub-queues. This may require more processing than the RR schedulers (which have a complexity of O(1)) and may also limit the scalability of FQ schedulers.

Many versions of FQ schedulers can be modified into Weighted Fair Queuing (WFQ) schedulers by configuring weights for the sub-queues, where the weights can be used to implement some types of QoS policies. A sub-queue weight can be expressed in bytes per second.

Self-Clocked Fair Queuing (SCFQ) is a FQ scheduler that uses the notion of virtual time based on the sub-queues rather than the overall queue structure. The virtual time is effectively related to the byte count progress in a sub-queue. When a packet arrives at the SCFQ queue structure, the system can assign the packet a finish time as its associated packet virtual time. If the sub-queue is empty, the system can set the finish time of the packet to the global virtual time plus the size of the packet in bytes divided by the weight of the sub-queue. If the sub-queue is not empty, the system can set the finish time of the packet as the finish time of the previous packet on that sub-queue plus the size of the packet in bytes divided by the weight of the sub-queue.

To forward a packet, the SCFQ scheduler can scan the sub-queues and select the packet with the lowest finish time (i.e., based on the associated packet virtual time). After forwarding that packet, the SCFQ scheduler can update the global virtual time with the finish time of that forwarded packet.

Start-time Fair Queuing (STFQ) may provide an improvement over SCFQ and can be considered one of the most efficient and fair schedulers. The main difference between STFQ and SCFQ is that STFQ uses the start time of packets instead of the finish time. In STFQ, the packet virtual time can be determined based on their start time and packets can be scheduled based on their start time. The global virtual time can also be updated using the start time of the packet.

Description of Self-Clocked Round Robin (SCRR) Scheduler

The described aspects provide a system and method which facilitates a Self-Clocked Round Robin (SCRR) scheduler, which can be considered a hybrid of a Fair Queuing scheduler and a Deficit Round Robin scheduler. The SCRR scheduler can track virtual time based on SCFQ (using the finish time of packets) or STFQ (using the start time of packets), but can schedule the sub-queues in round robin fashion.

The computational complexity of SCRR can be O(1), like DRR, and the average burstiness can be lower than that of DRR (in most cases). SCRR can thus provide: fair scheduling of sub-queues in bytes and bandwidth; low computational complexity (O(1)); low average burstiness; simple, fair, and efficient scheduling of packets; and ease of configuration.

As described above, DRR can be based on a quantum, which needs to be at least as large as the largest packet size, so that each time a non-empty queue is processed, a packet can be forwarded. However, if the network only uses small packets, many packets of the same sub-queue will be scheduled in sequence, as a burst. This can limit the average burstiness in DRR.

Operating Principles of SCRR

Figure 3:
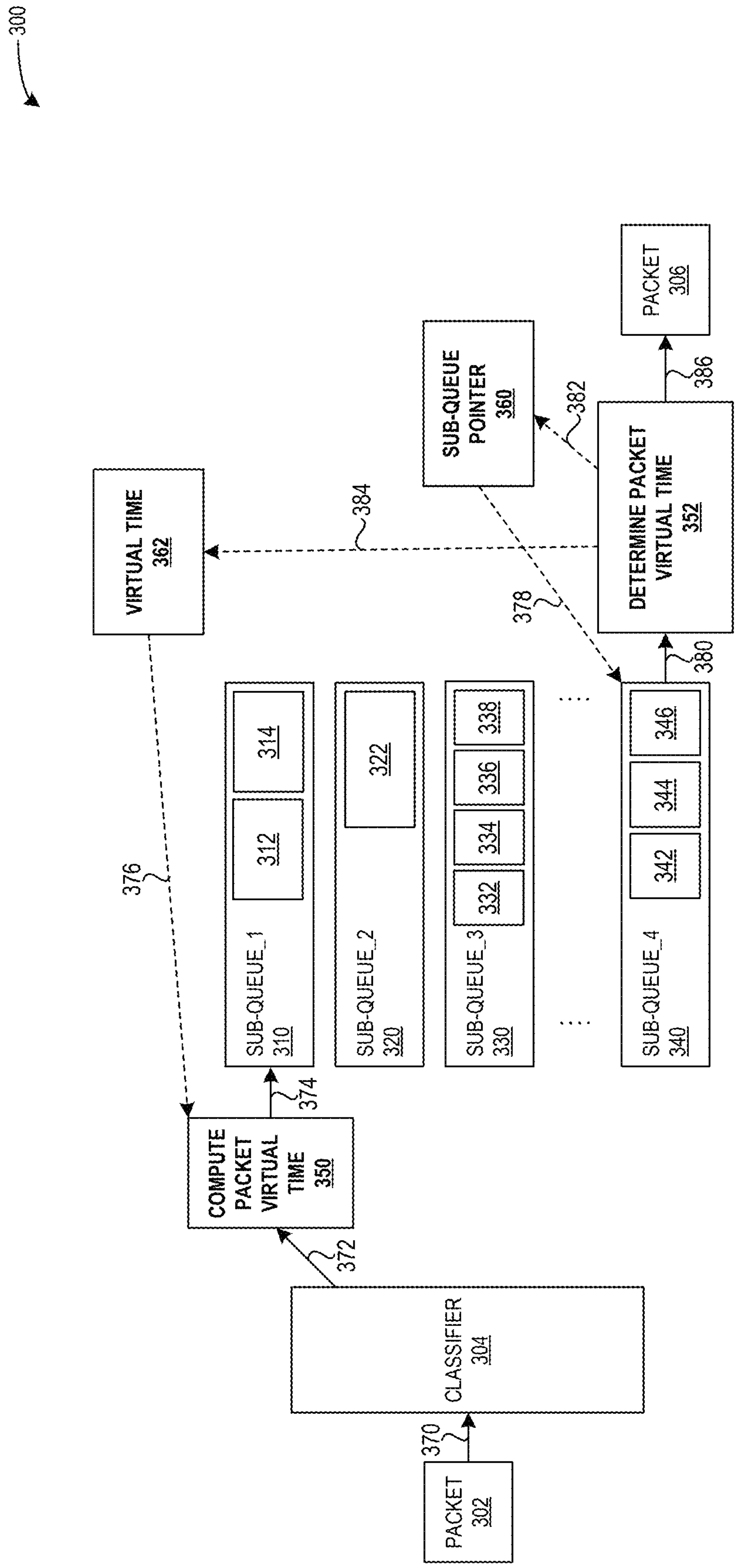
FIG. 3 illustrates an environment which includes a self-clocked round robin (SCRR) scheduler, in accordance with an aspect of the present application.

The described aspects of SCRR can eliminate the concept of a quantum by using the virtual time concept of SCFQ and STFQ as well as a novel scheduler. FIG. 3 illustrates an environment 300 which includes a self-clocked round robin scheduler (SCRR), in accordance with an aspect of the present application. Environment 300 can include a classifier 304, a plurality of sub-queues 310, 320, 330, and 340 (i.e., the SCRR queue structure), and scheduling functionality, in accordance with an aspect of the present application. As in environment 200, sub-queues 310, 320, 330, and 340 can be FIFO queues, can each be associated with a particular class, and can include zero or more packets. For example: sub-queue_1 310 can include at least packets 312 and 314; sub-queue_2 320 can include at least a packet 322; sub-queue_3 330 can include at least packets 332, 334, 336, and 338; and sub-queue_4 340 can include at least packets 342, 344, and 346. Environment 300 may include a fewer or greater number of sub-queues than as illustrated in FIG. 3. Scheduler functionality in FIG. 3 can be represented by bold text (indicating operations and stored information) and can include performing operations (e.g., a compute packet virtual time 350 operation and a determine packet virtual time 352 operation) and storing or updating information associated with the SCRR queue structure (e.g., a virtual time 362 and a sub-queue pointer 360). Virtual time 362 can correspond to a current global virtual time for the SCRR queue structure, while sub-queue pointer 360 can correspond to a currently selected sub-queue of the SCRR queue structure.

In environment 300, a packet 302 can be received by classifier 304 (via a communication 370). Classifier 304 can classify packet 302 by assigning a class to packet 302, to be enqueued at the end (i.e., the tail) of the corresponding sub-queue. Upon arrival of packet 302 at the SCRR queue structure (i.e., upon enqueuing into sub-queue_1 310 after classification), the system can compute the packet virtual time (operation 350) based on SCFQ (using the finish time) or STFQ (using the start time) (indicated by communications 372 and 374). If the sub-queue is empty, the packet virtual time can be based on the global virtual time (e.g., virtual time 362, obtained via a communication 376). If the sub-queue is not empty, the packet virtual time can be based on the packet virtual time associated with the previous packet (e.g., 312) on that sub-queue plus its size in bytes divided by the weight of the sub-queue.

The SCRR scheduler can perform scheduling of packets (i.e., dequeuing) based on round robin, in which the sub-queues can be an ordered plurality of sub-queues that the SCRR scheduler can process in sequence. As sub-queue pointer 360 tracks the currently selected sub-queue (e.g., sub-queue_4 340 as indicated by a dashed line 378), the SCRR scheduler can dequeue a packet from the currently selected sub-queue (e.g., a packet 346) and determine the packet virtual time of dequeued packet 346 (operation 352 based on information obtained from packet 346 via a communication 380). The SCRR scheduler can forward the dequeued packet (e.g., as shown by a packet 306 via a communication 386).

The SCRR scheduler can subsequently determine whether to continue dequeuing packets from the same sub-queue or to advance to the next sub-queue. The SCRR scheduler can make this decision by comparing the packet virtual time of the next packet in the same sub-queue with the global virtual time.

For example, if sub-queue_4 340 contains some packets whose packet virtual time is older (i.e., lower) than the global virtual time (362), all those packets can be forwarded in sequence (e.g., via 386). The SCRR scheduler can continue scheduling packets of that sub-queue_4 340 until the next packet has a packet virtual time which is younger (i.e., higher) than the global virtual time. This can allow the sub-queue to catch up with the global virtual time.

If the sub-queue does not have any packets whose packet virtual time is older (i.e., lower) than the global virtual time, the SCRR scheduler can schedule only the first packet of the sub-queue, potentially update the global virtual time (as described below in relation to FIGS. 4A and 4B) with the associated virtual time of that packet, and move or advance to the next sub-queue (e.g., update sub-queue pointer 360 via 382 to point to the next sub-queue). In a default configuration, the SCRR scheduler can only update the global virtual time (i.e., updates virtual time 362 via 384) once per cycle through the sub-queues in order to constrain the global virtual time to advance by the smallest increment necessary. That is, the SCRR scheduler can advance the global virtual time only once per round robin cycle. If there are n active queues (i.e., sub-queues) in the round robin cycle, after advancing through n sub-queues, the SCRR scheduler can consider the greatest or highest packet virtual time of all the dequeued packets. If this greatest packet virtual time is greater than the global virtual time, the SCRR can update the global virtual time to the value of this greatest packet virtual time (via 384).

The SCRR scheduler can update the global virtual time using different techniques. In a first technique, the global virtual time can be updated with the value of the greatest packet virtual time amongst n packets, irrespective of the previous value of the global virtual time. In a second technique, every time a packet is dequeued, if its packet virtual time is greater than the global virtual time, the global virtual time can be updated with the value of the packet virtual time. Those two techniques can simplify processing at the cost of fairness, and the default version can be a combination of these two techniques.

In the described aspects of the SCRR scheduler, every time a non-empty sub-queue is processed, a packet is guaranteed to be forwarded, which can eliminate wasteful processing. Only a single packet which is greater than the global virtual time can be processed, so in each sub-queue the sub-queue virtual time can only advance beyond the global virtual time by the size of one packet divided by the sub-queue weight. Over a single round robin cycle through the sub-queues, the global virtual time can only advance by the size of the largest forwarded packet divided by the smallest sub-queue weight. This can limit the length of packet bursts, which can be smaller or equal to twice the largest packet size forwarded.

Thus, the SCRR scheduler can effectively implement a round robin scheduler with byte fairness and an adaptive quantum. The adaptive quantum can be the size of the largest dequeued packet in a cycle through the sub-queues.

SCRR No Packet Metadata

Unlike DRR, SCRR is not self-contained. As a result, metadata must be added to each packet in the queue structure during the enqueue process. In a modified version of SCRR, referred to as "SCRR No Packet Metadata" (or "SCRR Self-Contained"), packet metadata is not required during the enqueue process and can instead be handled in the dequeue process. Upon dequeuing a packet, SCRR Self-Contained can compute the packet virtual time, similar to the computation performed during the enqueue process of SCRR. First, given a sub-queue, the system determines how the virtual finish time of the previous packet in that sub-queue relates to the global virtual clock at that time. Next, the system uses the global virtual time of the previous scheduling round for that comparison. If the virtual finish time of the previous packet is newer than the global virtual time of the previous round, this indicates that the sub-queue was scheduled in the previous round or the current round, and the system sets the packet virtual time to the virtual finish time of the previous packet in the sub-queue. Otherwise, the system sets the packet virtual time to the current global virtual time. The rest of SCRR Self Contained can be identical to SCRR.

No Empty Technique for SCRR

Types of Sub-Queues; Issues with Handling Empty Visits

Sub-queues in a queue structure can be in several different states. A "heavy" subqueue can be a sub-queue that almost always has at least one packet queued at any time. A heavy sub-queue can typically be used by a throughput-intensive application. A "light" or a "sparse" sub-queue is a sub-queue that does not always have a packet queued in each scheduling round. A light sub-queue can typically be used by a latency-sensitive application. In general, a latency-sensitive application will use less than its fair share of the scheduler bandwidth, which can prevent packets from accumulating in its sub-queue and will therefore most often result in a light sub-queue. An "idle" sub-queue can be a sub-queue that does not have any packets queued for multiple scheduling rounds. An idle sub-queue can typically be associated with an application that has finished its data transfer.

The sub-queue states can be transitory, in that a sub-queue can move from one state to another. For example, if an application stops sending data, its sub-queue state can change from heavy to idle.

An "empty visit" can occur when the scheduler visits a sub-queue, but that sub-queue is empty, i.e., the sub-queue has no packet or packets to schedule. Idle and light sub-queues can result in empty visits. Visiting a sub-queue can be a costly operation in processing or memory resources, as the sub-queue must be accessed and a packet needs to be dequeued. The scheduler is responsible for performing the visits and dequeuing. However, because no packet is dequeued, an empty visit can result in wasted processing and memory resources. In addition, the scheduler may visit successive sub-queues without packets, resulting in more empty visits.

In software, empty visits can cause additional overhead through wasted CPU processing and also CPU cache pollution. The system needs to load information about the sub-queue into the CPU cache, which may evict more important data from the cache. In hardware, most implementations of network processing have hard real-time constraints in order to meet the desired packet rate and fit into the processing pipeline. As a result, hardware processing needs to be deterministic and bounded. However, the unpredictable frequency and occurrence of empty visits may result in an unbounded amount of processing needed to forward a packet, which may potentially violate the real-time constraints.

The DRR scheduler can handle the problem of empty visits by ensuring that empty sub-queues are never placed in the list of sub-queues to schedule. When processing a sub-queue, after dequeuing a packet, if that packet was the last in the sub-queue and the sub-queue is now empty, the DRR scheduler removes the sub-queue from the list of sub-queues to schedule. When a packet is enqueued in a sub-queue which is not part of the schedule, the sub-queue is added at the tail of the list of sub-queues to schedule. Adding the sub-queue to the head of the list could create unfairness in processing and forwarding packets. For example, if a flow "drips" packets one by one into a sub-queue, the sub-queue may constantly go in and out of the list of sub-queues, have its packets be scheduled, and prevent the other sub-queues from being visited, which can result in starvation. One limitation in how the DRR scheduler handles empty visits is that when the previously empty sub-queue is reinserted into the scheduler, the sub-queue has lost its original spot, will always be last, and must wait until it is again visited by the scheduler. This can result in an increase in the queuing time experienced by light sub-queues, and correspondingly, in the latency experienced by latency-sensitive applications.

Sparse Flow Optimization as Potential Solution to Handling Previously Empty Sub-Queues; Empty Visit Issues with Sparse Flow Optimization A technique called "Sparse Flow Optimization" (SFO) can be used to reduce the latency of latency-sensitive applications by allowing immediate scheduling of previously empty sub-queues. In SFO, the scheduler can implement two lists of sub-queues: a "new" list for immediate scheduling; and an "old" or "original" list for regular scheduling, i.e., for sub-queues that were not previously empty. The scheduler will schedule all sub-queues in the new list before scheduling the sub-queues in the old list. Specifically, when scheduling sub-queues, the scheduler first attempts to visit a sub-queue from the new list. If the new list is empty, the scheduler visits a sub-queue from the old list. When visiting a sub-queue, if the sub-queue is not empty, the scheduler dequeues and forwards a packet and subsequently adds the sub-queue back at the tail of the old list, even if the sub-queue is empty. When visiting a sub-queue, if the sub-queue is empty (i.e., an empty visit), the scheduler removes the sub-queue from the schedule. When enqueuing a packet into a sub-queue which was previously empty (i.e., that sub-queue is not in the schedule), the scheduler adds that sub-queue to the new list.

In SFO, previously empty sub-queues are added effectively in the schedule ahead of other sub-queues. This can dramatically reduce the queuing time of packets in the previously empty sub-queues and can decrease the latency of latency-sensitive applications. However, scheduling previously empty sub-queues ahead of other sub-queues can lead to starvation of those other sub-queues. To prevent starvation, in SFO, an empty sub-queue is not immediately removed from the list of sub-queues to schedule (i.e., old list). Instead, an empty sub-queue can be added at the end of the old list. While that empty sub-queue is in the old list, waiting to be visited, some packets may be enqueued on that sub-queue. After a full scheduling round, the scheduler can visit that sub-queue again. If a packet was enqueued on that sub-queue while the sub-queue was waiting to be visited, the scheduler can forward the packet normally and the sub-queue can remain in the old list. If no packets were enqueued on that sub-queue while the sub-queue was waiting to be visited (i.e., that sub-queue is still empty when visited after a full scheduling round), this results in an empty visit and the scheduler removes that sub-queue from the schedule (i.e., removes from the old list). This can effectively force any empty sub-queue to wait a full scheduling round before being eligible to go back into the new list.

One advantage of SFO is that it can significantly decrease the latency experienced by latency-sensitive applications. However, one disadvantage is that the scheduler may experience "empty visits." Those empty visits can be caused by the need to prevent starvation of the heavy sub-queues. Idle sub-queues may not result in too many empty visits because a single empty visit can usually be enough to remove an idle sub-queue from the schedule. On the other hand, light or sparse sub-queues may go in and out of the schedule repeatedly, resulting in frequent empty visits. While the tradeoff in software between increasing CPU overhead to decrease latency may be acceptable, implementation of a similar scheme in hardware may be less practical.

No Empty for SCRR: a Solution to Empty Visit Issues with SFO

Aspects of the instant application provide a system and method referred to as "No Empty for SCRR" (or "No Empty") which can reduce CPU overhead and improve packet latency when using SFO. No Empty can use the virtual clock of a sub-queue that needs to be inserted in the schedule to determine whether that sub-queue can use immediate scheduling or not. No Empty can enable the usage of SFO in hardware implementations of SCRR and can also significantly decrease the CPU overhead in software when using SFO. No Empty relies on a virtual clock, and thus can be used with SCRR but not with DRR.

No Empty can improve latency through the use of SFO. No Empty can decrease processing overhead by eliminating empty visits and provide deterministic and bounded processing for hardware implementations. No Empty can be compatible with the SCRR scheduler and SCRR No Packet Metadata. No Empty does not violate fairness and burstiness properties of the scheduler and requires no configuration.

Recall that in SFO, an empty sub-queue is kept in the schedule (i.e., by being placed at the end of the old list) and must wait a full scheduling round before being visited again. Upon being visited again, if the sub-queue is still empty, this can result in an undesirable and wasted empty visit. The DRR solution can include eliminating empty visits by removing sub-queues (which have been become empty after dequeuing a packet) from the list of sub-queues to schedule. However, the sub-queue may return to the schedule when using SFO, which can result in starvation, as described above.

The described aspects of No Empty in the instant application can address these issues by using the virtual clock to determine whether a previously empty sub-queue is eligible to use immediate scheduling, and by inserting the sub-queue in the schedule based on the determination, as described below in relation to FIG. 4. If the previously empty sub-queue is determined to be eligible for SFO, then immediate scheduling can be used, e.g., by adding the previously empty sub-queue to the end of the new list. If the previously empty sub-queue is determined not to be eligible for SFO, then regular scheduling can be used, e.g., by adding the previously empty sub-queue to the end of the old list (i.e., the list of sub-queues to schedule). In regular scheduling, by adding the previously empty sub-queue to the end of the old list, the previously empty sub-queue will not be included in the current scheduling round and will instead be scheduled in the next scheduling round. This can cause a similar effect as the original implementation of SFO, e.g., allowing other sub-queues to be visited, preventing other sub-queues from starvation, and maintaining fairness. An environment which facilitates implementing No Empty is described below in relation to FIG. 4.

No Empty cannot apply to DRR because there is no way to determine whether a previously empty sub-queue is eligible to use immediate scheduling. On the other hand, because SCRR is based on a virtual clock, No Empty can leverage the properties of the virtual clock to determine whether a previously empty sub-queue is eligible to use immediate scheduling.

Versions of No Empty for SCRR

No Empty can be implemented as three different versions-"No Empty Deferral," "No Empty Packet," and "No Empty Finish." A first version of No Empty, referred to as "No Empty Referral," can emulate the original implementation of SFO using virtual time. SCRR can include scheduling rounds that can be identified using the global virtual clock. At the end of a scheduling round, the global virtual clock can be advanced. Let c(k) be the clock at the start of round k and let c(k−1) be the clock at the start of the previous round. Let vp(sq,i) be the virtual time of packet p(sq,i) on sub-queue q. When the scheduler visits sub-queue sq at round k−1, all packets which have a virtual time vp(sq,i) which is older than c(k−1) can be dequeued and forwarded. If vp(sq,i) is greater than c(k−1), then the scheduler may dequeue only a single packet.

Thus, at the start of round k, all packets older than c(k−1) have been dequeued and forwarded at round k−1. The packets which were dequeued and forwarded at round k must have the virtual time of those packets being after the global virtual clock at the start of the previous round:

$$vp(sq, i) > c(k-1)$$

The reverse may not be true, as some packets which were dequeued and forwarded at round k−1 may also have had the virtual time of those packets being after the global virtual clock of the start of the previous round (i.e., vp(sq,i)>c(k−1)).

The described aspects of No Empty can use the virtual clock to determine if a sub-queue was not part of the current scheduling round. Let vql(qd) be the virtual time of the last packet dequeued from sub-queue qd. If vql(qd)<=c(k−1), then that sub-queue did not forward any packets in the current scheduling round. However, the reverse is not true, i.e., if vql(qd)>c(k−1), the sub-queue may have forwarded its last packet in the current scheduling round or only in the previous round.

Thus, this version of No Empty (i.e., No Empty Deferral) can test the virtual time of the last packet of a sub-queue against the virtual clock of the last schedule or round. If vql(qd)<=c(k−1), the sub-queue can use immediate scheduling; otherwise, the sub-queue can use regular scheduling.

Two issues may exist with No Empty Deferral. First, some sub-queues that were not visited in the current schedule may fail this test and may use regular scheduling instead of immediate scheduling. This may reduce the effectiveness of Sparse Flow Optimization. Second, the sub-queue does not track the start time of the previous packet, and this packet has already been dequeued and forwarded. The scheduler would need to be modified to keep track of that virtual time.

Thus, No Empty Deferral can defer immediate scheduling and prevent unfairness, but may be suboptimal. When a sub-queue is used in the current schedule, that sub-queue may not always need to be deferred; that sub-queue can again be a part of the current schedule, as long as the burstiness and fairness of the scheduler are not violated. In other words, if the sub-queue has only sent a small packet in the current scheduling round, it can be acceptable for that sub-queue to send more small packets in that same scheduling round, as long as it does not send more bytes than the other sub-queues.

Another version of No Empty, referred to as "No Empty Packet," can implement this policy. No Empty Packet can look only at the virtual time of packet at the head of the sub-queue and determine whether that packet belongs in the current schedule. If the packet belongs in the current schedule, the sub-queue can use immediate scheduling; otherwise, the sub-queue can use regular scheduling. Let vqn(qd) be the virtual time of the new packet at the head of the sub-queue. If vqn(qd)<=c(k), the sub-queue can use immediate scheduling; otherwise, the sub-queue can use regular scheduling.

In a special case, if the virtual time of the new packet was set to the global virtual clock of the current round because the finish time of the previous packet was older than the global virtual clock, then this packet is also eligible for immediate scheduling.

No Empty Packet can prevent starvation of the other sub-queues in the schedule. Every time a sub-queue uses immediate scheduling to forward a packet, the virtual clock for its packet can advance. Eventually, that virtual clock can become newer than the global virtual clock, and that sub-queue will no longer be eligible for immediate scheduling. Because No Empty Packet uses a virtual clock test that is identical to the one used for previously non-empty sub-queues, the system can preserve the fairness and burstiness properties of the scheduler. In general, No Empty Packet can be much more aggressive than No Empty Deferral, and No Empty Packet can use immediate scheduling in more cases. This can result in further decreasing the latency of latency sensitive applications.

As described above, in SCRR No Packet Metadata, packet virtual times are not computed in the enqueue process. However, the determination to use immediate scheduling must be performed in the enqueue process, since the sub-queue is not yet in the schedule. One solution can be to compute the packet virtual time in the enqueue process, but this can add complexity and overhead.

Another version of No Empty, referred to as "No Empty Finish," can address this issue by looking at the finish time of the previous packet on that sub-queue. As part of SCRR, the sub-queue will always save the finish time of the previous packet in the metadata of the sub-queue. If the sub-queue was previously empty and a single new packet is enqueued into the sub-queue, the head packet to be scheduled is also the tail packet just enqueued. This new packet will be the next packet when the sub-queue is next visited. The virtual time of the packet will be either that finish time or the global virtual clock.

Let vqtf(qd) be the finish time of the previous tail packet on that sub-queue. In No Empty Finish, if vqtf(qd)<=c(k), then the sub-queue is eligible for immediate scheduling; otherwise, the sub-queue can use regular scheduling. No Empty Finish can properly handle the special case when the virtual time of the packet is set to the global virtual clock. Thus, No Empty Finish can be optimal for both the original version of SCRR and SCRR No Packet Metadata, and No Empty Finish can have the same behavior as No Empty Packet.

Environment Which Facilitates Implementing No Empty

Figure 4:
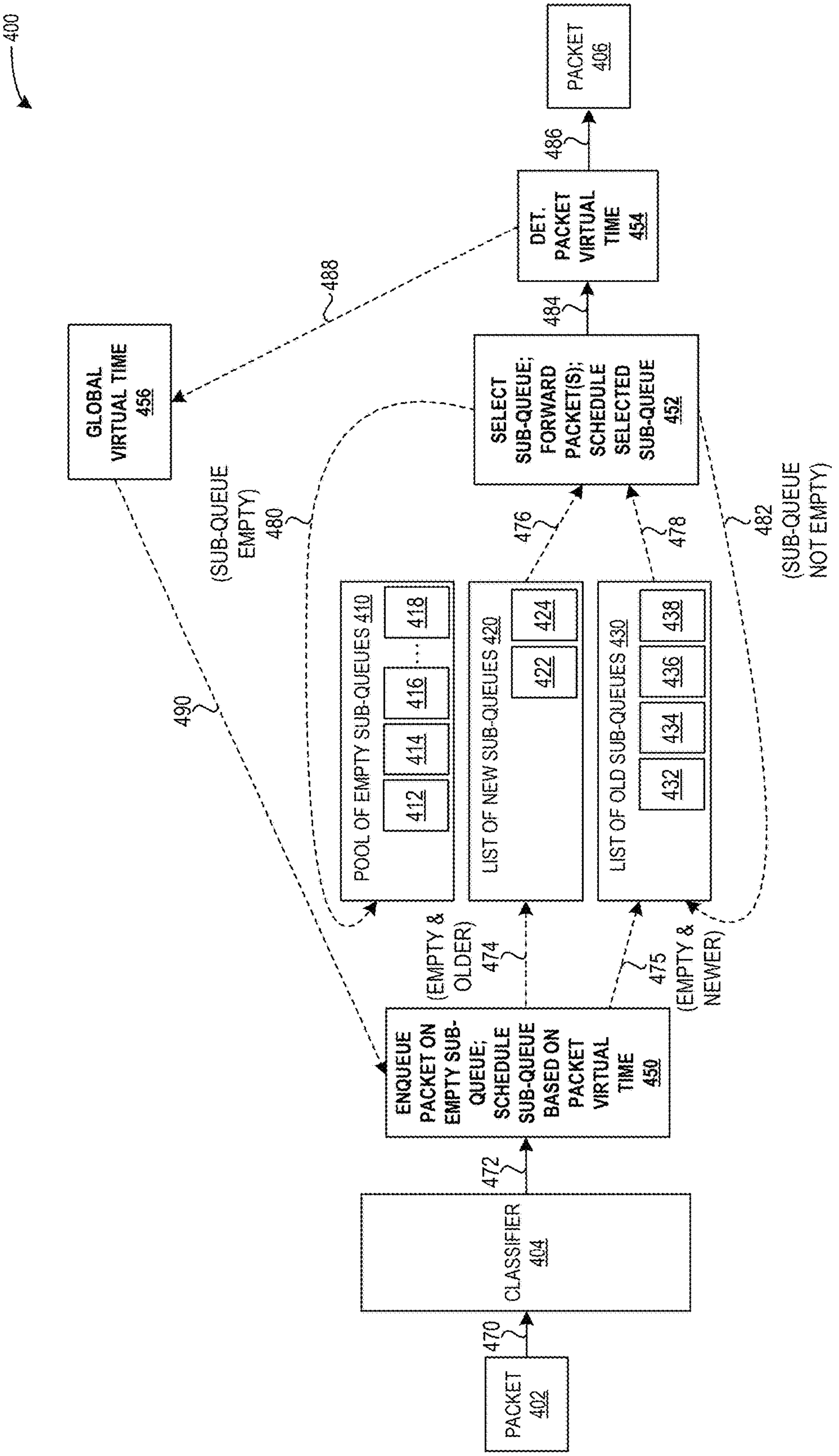
FIG. 4 illustrates an environment which depicts handling previously empty sub-queues in an SCRR scheduler ("No Empty"), in accordance with an aspect of the present application.

FIG. 4 illustrates an environment 400 which depicts handling previously empty sub-queues in an SCRR scheduler ("No Empty"), in accordance with an aspect of the present application. Environment 400 can include: a classifier 404; a pool of empty sub-queues 410 which can include empty sub-queues 412, 414, 416, and 418; a list of new sub-queues 420, which can include non-empty sub-queues 422 and 424; and a list of old sub-queues 430, which can include non-empty sub-queues 432, 434, 436, and 438. The sub-queues in lists 420 and 430 can be inserted in a FIFO manner, with the head indicated at the right side of lists 420 and 430 and the tail indicated at the left side of lists 420 and 430.

As in environments 200 and 300, each sub-queue can be a FIFO queue, can be associated with a particular class, and can include zero or more packets. For example, sub-queues 412-418 in pool 410 can include zero packets, while sub-queues 422-424 in list 420 and sub-queues 432-438 in list 430 can include one or more packets. Environment 400 may include a fewer or greater number of sub-queues than as illustrated in FIG. 4. The functionality of the SCRR scheduler in FIG. 4 can be represented by bold text (indicating operations and stored information) and can include performing operations (e.g., an enqueue packet on empty sub-queue and schedule sub-queue based on packet virtual time 450 operation; a select sub-queue, forward packet, and scheduled selected sub-queue 452 operation; and a determine packet virtual time 454 operation) and storing or updating information associated with the SCRR queue structure (e.g., a global virtual time 456). Global virtual time 456 can correspond to a current global virtual time for the SCRR queue structure. While not depicted in FIG. 4, a sub-queue pointer (similar to sub-queue pointer 360 of FIG. 3) can indicate or correspond to a currently selected sub-queue of the SCRR queue structure.

In environment 400, the SCRR scheduler can always select sub-queues from which to dequeue packets by first selecting all sub-queues in the list of new-sub-queues 420. Only when the list of new sub-queues 420 is empty can the SCRR scheduler select sub-queues from the list of old sub-queues 430. Packets from selected sub-queues may be selected for forwarding based on the operations described above in relation to FIG. 3 and as described below in relation to operation 454 and packet 406.

In environment 400, a packet 402 can be received by classifier 404 (via a communication 470). Classifier 404 can classify packet 402 by assigning a class to packet 402, to be enqueued at the end (i.e., the tail) of a corresponding selected sub-queue. Upon arrival of packet 402 at the SCRR queue structure, the system can determine that the selected sub-queue to which the packet is to be enqueued is an empty sub-queue (e.g., 414) pulled from the pool of empty sub-queues 410 (where the selected sub-queue can be subsequently referred to as a "previously empty sub-queue"). The system can determine the virtual time of the packet based on the virtual time associated with the selected sub-queue (received via a communication 490), e.g., based on a previously enqueued packet in the selected sub-queue (calculated in operation 454) and the global virtual time (tracked in 456). Determining the packet virtual time is described above in relation to computing a packet virtual time based on SCFQ or STFQ, as described above in relation to operation 350. The system can enqueue the packet on the selected sub-queue (i.e., the previously empty sub-queue) (operation 450). Assuming that there are one or more non-empty sub-queues (i.e., that either one or both of lists 420 and 430 have at least one sub-queue), the system can also determine where and how to schedule that previously empty sub-queue based on the packet virtual time (operation 450). For example, the system can determine if the virtual time associated with the selected sub-queue is earlier (i.e., older) than or equal to the current global virtual time (based on data obtained via communication 490). If the virtual time associated with the selected sub-queue is earlier than or equal to the current global virtual time, the system can schedule the selected sub-queue for forwarding packets before the non-empty sub-queues, e.g., by placing the selected sub-queue at the tail of the list of new sub-queues 420 (as indicated by an "empty and older" insertion 474). If the virtual time associated with the selected sub-queue is later (i.e., newer) than the current global virtual time, the system can schedule the selected sub-queue for forwarding packets after the non-empty sub-queues, e.g., by placing the selected sub-queue at the tail of the list of old sub-queues 430 (as indicated by an "empty and newer" insertion 475).

The SCRR scheduler functionality can include selecting sub-queues from which to forward packets (operation 452), e.g., in a RR-based manner as described above. When using No Empty for SCRR, the scheduler can first select all sub-queues (if any) in the list of new sub-queues 420 for scheduling (indicated by a selection 476) before selecting the sub-queues (if any) in the list of old sub-queues 430 for scheduling (indicated by a selection 478). If the scheduler selects and visits sub-queue 424 from list 420, the scheduler can determine how many packets to schedule from sub-queue 424. If that selected sub-queue 424 is empty after being visited by the scheduler (i.e., no more packets remain in sub-queue 424), then the scheduler will place that empty sub-queue 424 into the pool of empty sub-queues (e.g., as indicated by a "sub-queue empty" insertion 480). However, if that selected sub-queue 424 is not empty after being visited by the scheduler (i.e., one or more packets still remain in sub-queue 424), then the scheduler will place that non-empty sub-queue 424 back at the tail of the list of old sub-queues 430 (e.g., as indicated by a "sub-queue not empty" insertion 482).

Furthermore, upon dequeuing a packet from a selected sub-queue (sub-queue 424, continuing with the example above), the system can determine the virtual time of the dequeued packet (operation 454), which can be used to update the global virtual time 456 (via a communication 488). In a default configuration, the SCRR scheduler can only update the global virtual time (e.g., global virtual time 456 via 488) once per cycle through the sub-queues in order to constrain the global virtual time to advance by the smallest increment necessary. The scheduler can also update the global virtual time using different techniques, as described above in relation to FIG. 3. The dequeued packet (e.g., 406) can be forwarded (as indicated by communications 484 and 486).

The scheduler can move or advance to (i.e., select or visit) another sub-queue from which to dequeue packets based on the SCRR functionality described above in relation to FIG. 3 (e.g., via 476 and 478). By tracking the global virtual time (456) and by determining the virtual time of a dequeued packet (which corresponds to the virtual time of the associated sub-queue), the system can perform operation 450 to schedule a particular sub-queue (i.e., place into a particular list at a particular position) based on the virtual time of the packet (which can be determined based on the sub-queue virtual time and the global virtual time).

Tracking Scheduling Rounds

In some implementations of SCRR, the determination of whether to allow immediate scheduling for a previously empty sub-queue may be intertwined with tracking the scheduling rounds. When using immediate scheduling, the sub-queue can be added to the current scheduling round, in which case, the length of scheduling round should be increased by one sub-queue. However, when using regular scheduling, the sub-queue is not part of the current scheduling round, in which case, the length of that scheduling round should not be increased.

In some instances, the scheduler may be empty, i.e., has no non-empty sub-queues to schedule, in which case it does not matter if the previously empty sub-queue uses immediate scheduling or regular scheduling, since that previously empty sub-queue will be the only sub-queue to schedule and thus will always be scheduled immediately. However, if the scheduler was empty, a new scheduling round must be initiated, and the sub-queue must be part of that scheduling round. As a result, the system may force that sub-queue to use immediate scheduling, regardless of virtual time, in order to maintain the correct length of the scheduling round.

Alternate Implementations of Lists

The above-described version of SFO in DRR can use two lists of sub-queues to achieve immediate scheduling of previously idle flows. The "new" list can be used for immediate scheduling and can contain previously empty sub-queues, while the "old" list be used for regular scheduling and can contain sub-queues that were not previously empty and also sub-queues that just became empty. Other implementations of SFO can be possible. The basic tenet of SFO is that sub-queues eligible for immediate scheduling are scheduled ahead of non-empty sub-queues, and otherwise, if the sub-queues are not eligible for immediate scheduling, those sub-queues can use regular scheduling and be scheduled after the non-empty sub-queues.

No Empty can use the same technique of having two lists. If vqtf(qd)<=c(k), then the sub-queue is added to the tail (or end) of the new list; otherwise, the sub-queue can be added at the tail (or end) of the old list. Sub-queues which have just become empty are no longer put in the old list.

Another implementation of SFO (and a corresponding implementation of No Empty for SCRR) may use only a single list of sub-queues to handle immediate scheduling of previously empty sub-queues. If vqtf(qd)<=c(k), then No Empty can add the sub-queue to the head (or start) of the list; otherwise, the sub-queue can be added at the tail (or end) of the single list. Using only the single list, multiple sub-queues which move from empty to non-empty (i.e., was, is, or has been previously empty) may be visited in reverse order, which in many cases may not be an issue. Other implementations of SFO are possible, especially in hardware, and corresponding improvements of No Empty for SCRR may thus also be possible.

Initial Advance Technique for SCRR

SCRR vs. DRR; Limitations in Forwarding Packets from Previously Empty Sub-Queues In SCRR, if a sub-queue was previously empty, the SCRR scheduler may add that sub-queue to the current schedule, but the sub-queue may only send one packet. In contrast, in DRR, a sub-queue that was previously empty can forward a full quanta, i.e., an amount of bytes equal to the other sub-queues and which can include multiple packets.

A sub-queue may be empty if all its packets have been forwarded and no new packet has been enqueued. The DRR scheduler can skip the empty sub-queue and stop adding to its deficit. When a new packet is enqueued on this previously empty sub-queue, the DRR scheduler must make the sub-queue part of the schedule again and reset its deficit. In a default version of DRR, upon visiting that sub-queue for the first time, the sub-queue can be assigned a quanta (like other sub-queues), and the scheduler can forward from that sub-queue as many bytes as the quanta, including forwarding multiple packets if they are small enough. Another version of DRR implemented in the Linux kernel can use an "initial quanta," which is a higher value than the standard or regular quanta. In this version of DRR, upon scheduling a previously empty sub-queue, at the first visit, the sub-queue can be assigned the initial quanta instead of the regular quanta. As a result, at this initial visit, the sub-queue can send many more bytes than the other sub-queues. Using the initial quanta can increase the performance of latency-sensitive applications having light sub-queues, but may break the burstiness and latency guarantees of DRR (i.e., resulting in an unfair advantage over the other sub-queues).

In addition, recall that SCRR is derived from SCFQ and STFQ, in which the packet virtual time is set to the greatest of the sub-queue virtual time and the global virtual clock. The sub-queue virtual time can be based on the previous packet and may effectively only be used when that virtual time occurs in the future. This can prevent the virtual time of the packet from being in the past.

Two issues may arise with having a packet virtual time in the past. First, in SCFQ and STFQ, this would cause the global virtual clock to go backward. This issue does not apply to SCRR, since SCRR can use a mechanism to prevent the global virtual clock from going backward. Second, this would enable the particular sub-queue to send a large number of packets ahead of the other sub-queues and potentially starve the other sub-queues. That is, any packet with a packet virtual time in the past would be sent ahead of other packets with newer or later packet virtual times. Thus, if the sub-queue virtual time is a long time ago in the past, the number of packets sent may be a large number until the packet virtual time reaches the current global virtual clock. As a result, SCFQ and STFQ can prevent a packet virtual time from being in the past.

Sub-queues that are busy may have packets waiting to be sent, which indicates that the sub-queue virtual time is in the future. For busy sub-queues, the packet virtual time is generally based on the previous packet. Sub-queues that were previously idle may not have packets waiting to be sent, as the previous packet was already sent, which indicates that the sub-queue virtual time is generally in the past. Thus, for sub-queues that were previously idle, the packet virtual time can be almost always equal to the current global virtual clock. The net effect is that the virtual time of the sub-queue can be advanced to the global virtual clock because the sub-queue virtual time is too far in the past.

Decreased Efficiency in Sending Only One Packet from Previously Empty Sub-Queues in SCRR SCRR can generally follow the design of SCFQ and STFQ and prevent the packet virtual time from being in the past, because the packet virtual time can be set to the larger or greater of the sub-queue virtual time and the global virtual clock.

In regular SCRR, the packet virtual time can be computed during the enqueue process into a sub-queue. The packet virtual time can be set to the newer of the finish time of the previous packet in the sub-queue and the global virtual time. Given an empty sub-queue, the finish time of the previous packet is in the past, so the packet virtual time can be set to the global virtual clock.

In SCRR No Packet Metadata, the packet virtual time can be computed during the dequeue process from a sub-queue, based on slightly different rules. If the finish time of the previous packet in the sub-queue is newer than the global virtual time of the previous round, the packet virtual time can be set to that finish time; otherwise, the packet virtual time can be set to the current global virtual time. If the sub-queue became empty in the previous scheduling round, the finish time may be newer than the previous global virtual clock, and the packet virtual time may be the finish time. If the sub-queue became empty earlier than the previous scheduling round, the packet virtual time will be the current global virtual clock.

If the packet virtual time is set to the current global virtual clock, then any subsequent packet on that sub-queue will have a virtual time greater than the current global virtual clock, and thus cannot be scheduled in the current scheduling round. As a result, except in a few cases, a previously empty sub-queue can only send a single packet in the scheduling round in which it is first scheduled.

Initial Advance: A Solution to Limitations of SCRR

The described aspects provide a solution to this limitation of SCRR by implementing a technique called "Initial Advance," which enables sub-queues that were previously idle (i.e., empty) to forward in the current scheduling round a number of bytes equal to the other sub-queues. Initial Advance can improve packet latency for light or sparse sub-queues. In Initial Advance, the virtual time of the first packet of a previously idle sub-queue can be set to a value older than the current global virtual clock. Initial Advance can result in decreasing the latency experienced by latency-sensitive applications without violating the burstiness and fairness properties of the scheduler. Using Initial Advance in SCRR can result in SCRR behaving more similarly to DRR. The latency in SCRR when using Initial Advance may be similar or better than DRR (without the initial quanta). Because Initial Advance depends on a virtual clock, Initial Advance can be used with SCRR, but not with DRR.

Virtual Time for Previously Empty Sub-Queues; Preventing the Virtual Clock from Going Backward In the majority of cases, if a sub-queue was previously idle (i.e., previously empty), the packet virtual time can be set to the current global virtual clock, as described above. This is because STFQ, the inspiration for SCRR, includes this functionality. In both SCFQ and STFQ, setting the virtual time to the global virtual clock is required, and changing this would alter the burstiness and fairness properties of those schedulers. However, SCRR does not need to follow this same operation. In contrast to SCFQ and STFQ, in SCRR, packets are not forwarded in order of their virtual clock. As a result, the precise assignment of virtual time to packets does not affect the operations of the SCRR scheduler, as long as the packet is sent in the proper scheduling round.

Given a packet in a previously empty sub-queue, the packet needs to be sent in the current scheduling round. As a result, the packet virtual time can have any value between the global virtual clock of the previous schedule and the current global virtual clock.

Let c(k) be the clock at the start of round k and c(k−1) be the global virtual clock or time at the start of the previous round. Let vp(sq,i) be the virtual clock or time of packet p(sq,i) on sub-queue sq. When the scheduler visits sub-queue sq at round k−1, all packets which have a virtual clock vp(sq,i) older than c(k−1) can be dequeued and forwarded. If vp(sq,i) is greater than c(k−1), only a single packet is dequeued.

At the start of round k, all packets older than c(k−1) have been dequeued and forwarded at round c(k−1). Thus, packets dequeued and forwarded at round k must have:

$$vp(sq, i) > c(k-1)$$

Assume that in SCRR, the maximum burst size can be 2*M, where M is the maximum packet size. Let lp(sq,i) be the size of a packet. Thus, the amount of bytes forwarded by that sub-queue at round k can be bounded by the virtual time constraints:

$$c(k-1) < vp(sq, i) <= c(k)$$

$$\text{sum } (lp(sq, i)) < (c(k) - c(k-1)) + M$$

$$\text{sum } (lp(sq, i)) < 2 * M$$

If a packet with vp(sq,i)<=c(k−1) were on the sub-queue at round k, then the sum of all packets sent during that visit would be greater than the clock advance for the round, which would violate the burstiness properties of the scheduler. If a sub-queue was previously idle, the number of bytes that this sub-queue can forward in the current scheduling round may depend entirely on the virtual clock of the first packet. This is because the virtual clock of all subsequent packets can be derived from the virtual time of that first packet.

Let vqn(qd) be the virtual time of the new packet at the head of the sub-queue after the sub-queue has been empty. The maximum amount of data that this sub-queue can send can be:

$$\text{sum } (lp(sq, i)) < (c(k) - vqn(qd)) + M$$

As a result, it can be clearly seen that a smaller (i.e., older) vqn(qd) can allow more data to be sent in the current scheduling round.

As discussed above, in any self-clocking scheme, the virtual clock should be prevented from going backward, since allowing this can break the burstiness and fairness of the scheduler and can also create potential infinite loops. Assume that for any packet for which the finish time of the previous packet is older than the current global virtual clock, the packet virtual time can be set to the global virtual clock of the previous schedule. If the packet size is less than the clock advance, then the finish time of this packet is less than current global virtual clock. Thus, the virtual time of the next packet on the sub-queue will also be the global virtual clock of the previous schedule. This can create an infinite loop, where an infinite number of packets from the sub-queue may be forwarded in the current scheduling round.

As a result, in SCRR, the test which determines how to set the packet virtual clock must be changed in order to ensure that the virtual time of packets cannot go backward. In SCRR No Packet Metadata, this can be achieved by comparing the finish time to the global virtual clock of the previous schedule.

Two Versions of Initial Advance

A first version of Initial Advance, referred to as "Simple Initial Advance," can maximize the amount of data that a previously empty sub-queue can send in the current scheduling round, without violating the burstiness and fairness properties of the SCRR scheduler. If the virtual finish time of the previous packet in that sub-queue is newer than the global virtual time of the previous scheduling round, then the packet virtual time can be set to that virtual finish time; otherwise, the packet virtual time can be set to the global virtual time of the previous scheduling round incremented by one byte.

Let vqtf(qd) be the finish time of the previous tail packet on the sub-queue. The virtual time of the new packet can be computed as:

$$\text{if } vqtf(qd) <= c(k-1)$$

$$\text{then } vqn(qd) = c(k-1) + 1$$

$$\text{else } vqn(qd) = vqtf(qd)$$

Thus, Simple Initial Advance can replace the current global virtual time with the global virtual time of the previous round. This change does not substantially increase the complexity of SCRR and can help reduce the latency of latency-sensitive applications.

Simple Initial Advance may be helpful to latency-sensitive applications, but may also increase the burstiness of the scheduler. A second version of Initial Advance, referred to as "Adaptive Initial Advance," can address the additional potential burstiness. Recall that the global virtual clock can increase by a maximum of M at every scheduling round. As a result, a sub-queue on average can send an amount of data per scheduling round equal to M. The maximum amount that a sub-queue can send is 2*M. However, if a sub-queue sends the maximum amount, the virtual time of packets may be ahead of the global virtual clock, which can prevent the sub-queue from repeating this until it slows down enough to be behind the clock. On the other hand, when the packet virtual clock for a previously empty sub-queue is set to the global virtual time of the previous scheduling round, if the sub-queue has packets, the sub-queue can be guaranteed to forward an amount of data equal to a least M bytes plus one packet in the scheduling round. This can result in increasing the average burstiness of the scheduler.

Adaptive Initial Advance can address this limitation by adapting the initial advance to the packet size. An application using small packets may be more likely to be latency-sensitive. In a sub-queue with small packets, the amount of data sent in its first scheduling round can be closer to M.

In Adaptive Initial Advance, if the virtual finish time of the previous packet in that sub-queue is older or equal to the global virtual time of the previous scheduling round, then the packet virtual time is set to the global virtual time of the previous scheduling round, incremented by the packet size divided by the weight of the sub-queue.

The virtual time of the new packet can be computed as:

$$\text{if } vqtf(qd) <= c(k-1)$$

$$\text{then } vqn(qd) = c(k-1) + \text{pkt\_en/weight}\,(qd)$$

$$\text{else } vqn(qd) = vqtf(qd)$$

The virtual time of the new packet can also be set or computed based on the global virtual time associated with the previously scheduling round, incremented by one of: the packet size; the packet size multiplied by an arbitrary factor (i.e., scaled by "a first random value"); and the packet size divided by the weight of the sub-queue multiplied by an arbitrary factor (i.e., scaled by "a second random value").

Handling Previously Empty Flows Using Initial Advance

Figure 5:
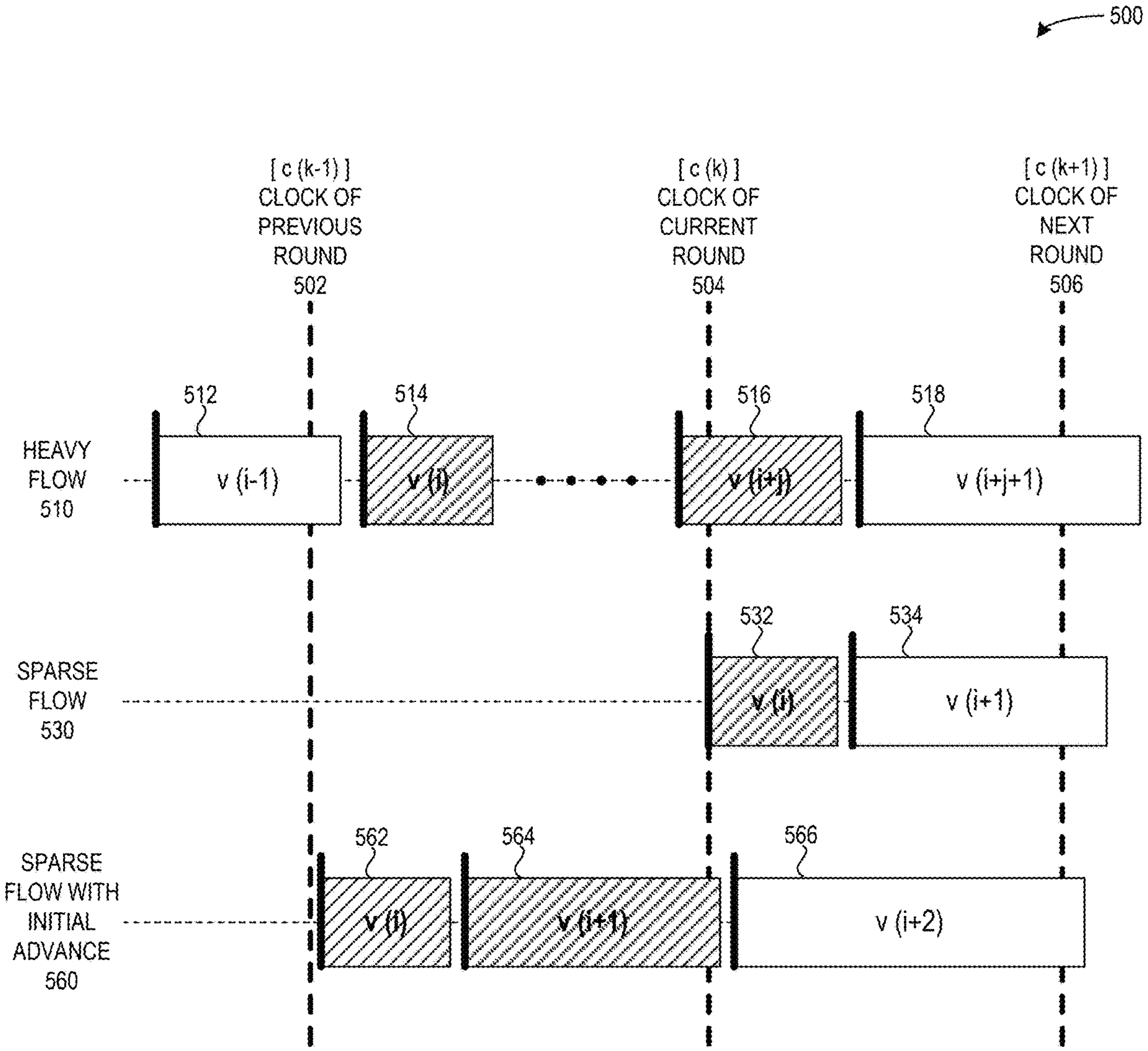
FIG. 5 illustrates sample flows of previously empty sub-queues ("Initial Advance"), in accordance with an aspect of the present application.

FIG. 5 illustrates a diagram 500 of sample flows, in accordance with an aspect of the present application. Diagram 500 can include a heavy flow 510, a sparse flow 530, and a sparse flow with Initial Advance 560. Diagram 500 can indicate the global virtual time for a given scheduling round as clock rounds or cycles with the heavy vertical dashed lines, e.g., a clock of previous round 502, which can be represented by c(k−1); a clock of current round 504, which can be represented by c(k); and a clock of next round 506, which can be represented by c(k+1). Each of flows 510, 530, and 560 can include packets (e.g., respectively, 512-518, 532-534, and 562-566) which are processed or forwarded in a given round based on the virtual start time of a given packet. Each packet can include a heavy bold solid line on the left hand side of the packet which indicates the virtual start time of the packet. Flow 510 can include packets 512, 514, 516, and 518, denoted respectively as: v(i−1); v(i); v(i+j); and v(i+j+1). Flow 530 can include packets 532 and 534 denoted respectively as: v(i); and v(i+j). Flow 560 can include packets 562, 564, and 566, denoted respectively as: v(i); v(i+1); and v(i+2). In addition, packets with right-slanting diagonal shading (e.g., 514, 516, 532, 562, and 564) indicate packets which are processed or forwarded in the current scheduling round.

Heavy flow 510 can indicate a sub-queue which is busy and almost always has at least one packet queued at any time. In a standard implementation of SCRR for heavy flow 510, diagram 500 depicts that packet 512 is forwarded during the previous round (502), and that packets 514 and 516, which both have start times which occur between the clock of the previous round 502 and the clock of the current round 504, are forwarded during the current round. In heavy flow 510, any packet which occurs between packet 514 v(i) and packet 516 v(i+j) and has a start time which occurs between the clocks of the previous and current rounds can be forwarded during the current round. Thus, a heavy flow can include a sufficient number and rate of packets being forwarded which may not trigger the same issues triggered by a previously idle or sparse flow.

Sparse (or light) flow 530 can indicate a sub-queue which does not always have a packet queued in each scheduling round. When a packet is inserted into a previously empty sub-queue and then visited by the scheduler, the packet flow depicted in sparse flow 530 may occur, i.e., no packets have been forwarded in the rounds prior to the current round. In a standard implementation of SCRR for sparse flow 530, the finish time of the previous packet in a sub-queue corresponding to sparse flow 530 may be very old or may have occurred a long time in the past. Because subsequently inserted packets (e.g., 532 and 534) to the sub-queue would have very old virtual times, those subsequent packets would be allowed for processing, which could result in allowing a large burst of data in the current round. Because the system prevents the virtual time of a packet from being in the past, the system can set the virtual time of that first packet (532) in the sparse flow (530) to the larger of the virtual time of the current sub-queue and the current global virtual clock. In this case, because the sub-queue virtual time is less than the current global virtual clock, the system can set the virtual time of the packet to the current global virtual clock, as indicated by the virtual time (here, the start time) of packet 532 being depicted at the line for the clock of current round 504.

However, in sparse flow 530, instead of setting the virtual time of packet 532 to the exact current global virtual time of the current round, the system can set the virtual time of packet 532 to any time between just after the clock of the previous round 502 and the clock of the current round 504, without violating burstiness or fairness principles of the SCRR scheduler. This mechanism has been described herein and referred to as "Initial Advance" and can allow an additional packet to be forwarded in the same current clock cycle, which can result in a more efficient use of the current clock round.

Sparse flow with Initial Advance 560 depicts this mechanism. Given a sparse flow similar to sparse flow 530 with packets inserted into a previously empty sub-queue (i.e., as part of a previously idle flow), the system can set the virtual time of the packet based on the global virtual time associated with the previous scheduling round (e.g., clock of previous round 502) incremented by a small amount, such as one byte (in the case of Simple Initial Advance) or the length of the packet (as in Adaptive Initial Advance). As a result, the first inserted packet 562 as well as the second inserted packet 564 can both be sent during the current scheduling round. Thus, the Initial Advance for SCRR mechanism can enable sub-queues that were previously empty (i.e., previously idle flows) to forward in the current scheduling round a number of bytes equal to the other sub-queues.

Method for Facilitating No Empty and Initial Advance for SCRR

Figure 6A:
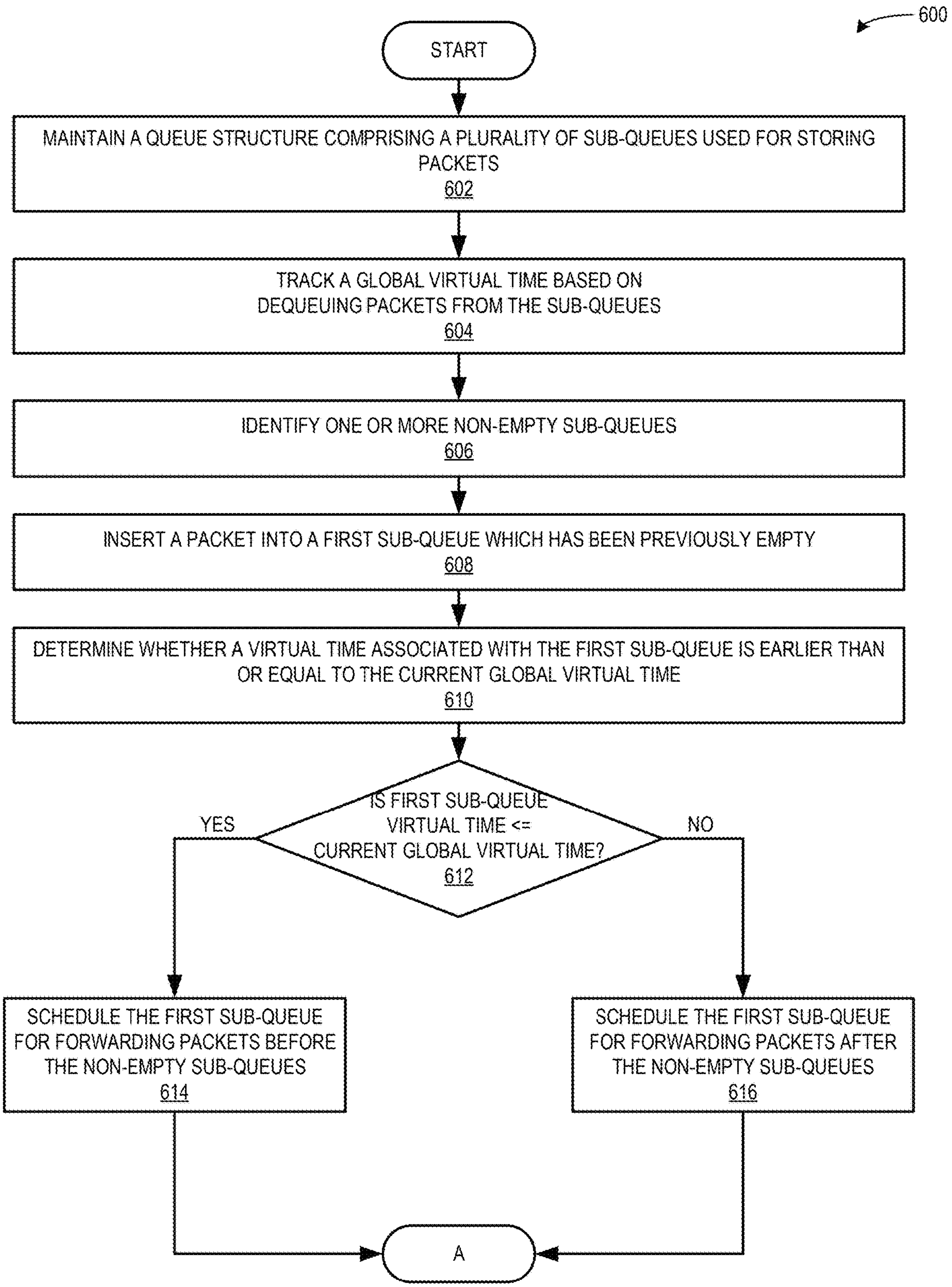
FIG. 6A presents a flowchart illustrating a method which facilitates handling previously empty sub-queues in an SCRR scheduler, including operations relating to No Empty, in accordance with an aspect of the present application.

FIG. 6A presents a flowchart 600 illustrating a method which facilitates handling previously empty sub-queues in an SCRR scheduler, including operations relating to No Empty, in accordance with an aspect of the present application. During operation, the system maintains a queue structure comprising a plurality of sub-queues used for storing packets, wherein packets in the sub-queues are to be dequeued by a scheduler, wherein a respective packet is enqueued into a sub-queue, and wherein a virtual time associated with the respective packet is based on a current sub-queue virtual time corresponding to a previously enqueued packet in the sub-queue (operation 602). A queue structure with a plurality of sub-queues is depicted above in relation to FIG. 3 (SCRR), and a queue structure with a plurality of sub-queues in separate lists is depicted above in relation to FIG. 4 (No Empty for SCRR). The system tracks a global virtual time based on dequeuing packets from the sub-queues (operation 604). For example, the system can advance the global virtual time based on a virtual time associated with the packets dequeued from the sub-queues or in response to completing a scheduling round in which the sub-queues are scheduled by the scheduler, as described above in relation to operations 350 and 352 and virtual time 362 of FIG. 3.

The system identifies one or more non-empty sub-queues (operation 606) and inserts a packet into a first sub-queue which has been previously empty (operation 608). For example, in FIG. 4, list 430 contains at least one sub-queue and thus comprises the one or more non-empty sub-queues. Pool 410 in FIG. 4 also contains at least one sub-queue (e.g., 414), which can be selected (based on operations of classifier 404) as the sub-queue into which to insert the packet.

The system determines whether a virtual time associated with the first sub-queue is earlier than or equal to the current global virtual time (decision 610), as described above in relation to operation 450 of FIG. 4. In response to the virtual time associated with the first sub-queue being earlier than or equal to the current global virtual time (decision 612), the system schedules the first sub-queue for forwarding packets before the non-empty sub-queues (operation 614). The system can schedule the first sub-queue for forwarding packets before the non-empty sub-queues in response to, e.g.: a virtual time associated with a most recently dequeued packet from the first sub-queue being earlier than or equal to the global virtual time associated with a previous scheduling round; a virtual time associated with a packet at a head of the first sub-queue being earlier than or equal to the global virtual time associated with a current scheduling round; or a finish time associated with a packet at a tail of the first sub-queue being earlier than or equal to the global virtual time associated with a current scheduling round. In response to the virtual time associated with the first sub-queue being later than the current global virtual time (decision 612), the system schedules the first sub-queue for forwarding packets after the non-empty sub-queues (operation 616). Scheduling the first sub-queue before or after the non-empty sub-queues can be based on placing the sub-queue at, respectively, the head or tail of a single list. Scheduling the first sub-queue before or after the non-empty sub-queues can also be based on two lists, e.g., scheduling before by placing the first sub-queue on a new list of sub-queues (e.g., list 420 of FIG. 4) or scheduling after by placing the first sub-queue on an old list of sub-queues (e.g., list 430 of FIG. 4). The operation continues at Label A of FIG. 6B.

Figure 6B:
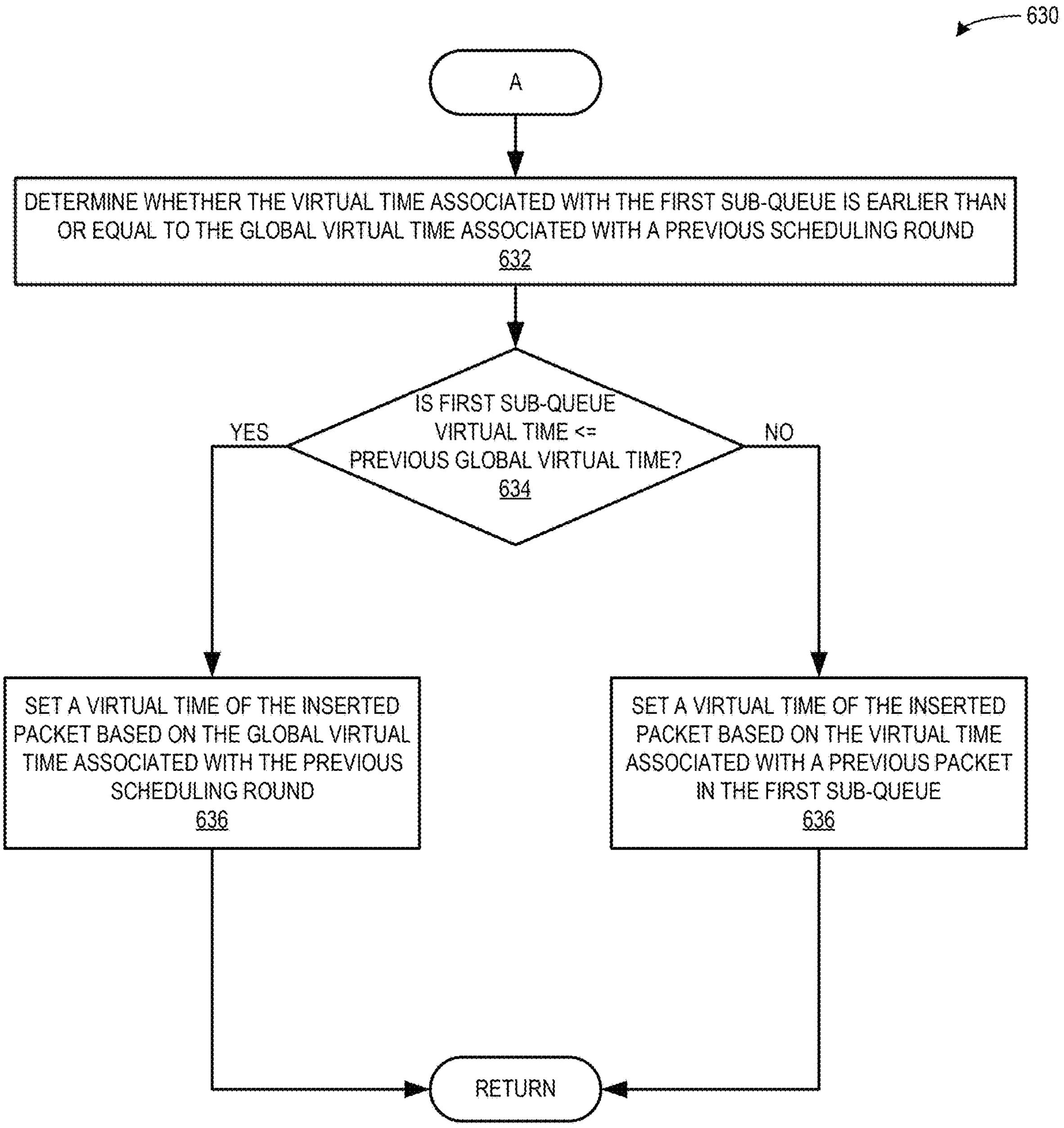
FIG. 6B presents a flowchart illustrating a method which facilitates handling previously empty sub-queues in an SCRR scheduler, including operations relating to Initial Advance, in accordance with an aspect of the present application.

FIG. 6B presents a flowchart 630 illustrating a method which facilitates handling previously empty sub-queues in an SCRR scheduler, including operations relating to Initial Advance, in accordance with an aspect of the present application. The system determines whether the virtual time associated with the first sub-queue is earlier than or equal to the global virtual time associated with a previous scheduling round (operation 632). The system can handle setting the virtual time of a packet inserted into a previously empty sub-queue as described above in relation to FIG. 5, e.g., using the two versions of Initial Advance. If the virtual time associated with the first sub-queue is earlier than or equal to the global virtual time associated with a previous scheduling round (decision 634), the system sets a virtual time of the inserted packet based on the global virtual time associated with the previous scheduling round (operation 636). The global virtual time associated with the previous scheduling round can be incremented by one byte (as in Simple Initial Advance) or by the length of the inserted packet (as in Adaptive Initial Advance), as described above in relation to sparse flow with initial advance 560 of FIG. 5. If the virtual time associated with the first sub-queue is later than the global virtual time associated with a previous scheduling round (decision 634), the system sets a virtual time of the inserted packet based on the virtual time associated with a previous packet in the first sub-queue (operation 636), similar to the behavior described above in relation to operations 350 and 352 and virtual time 362 of FIG. 3. The operation returns.

Figure 7:
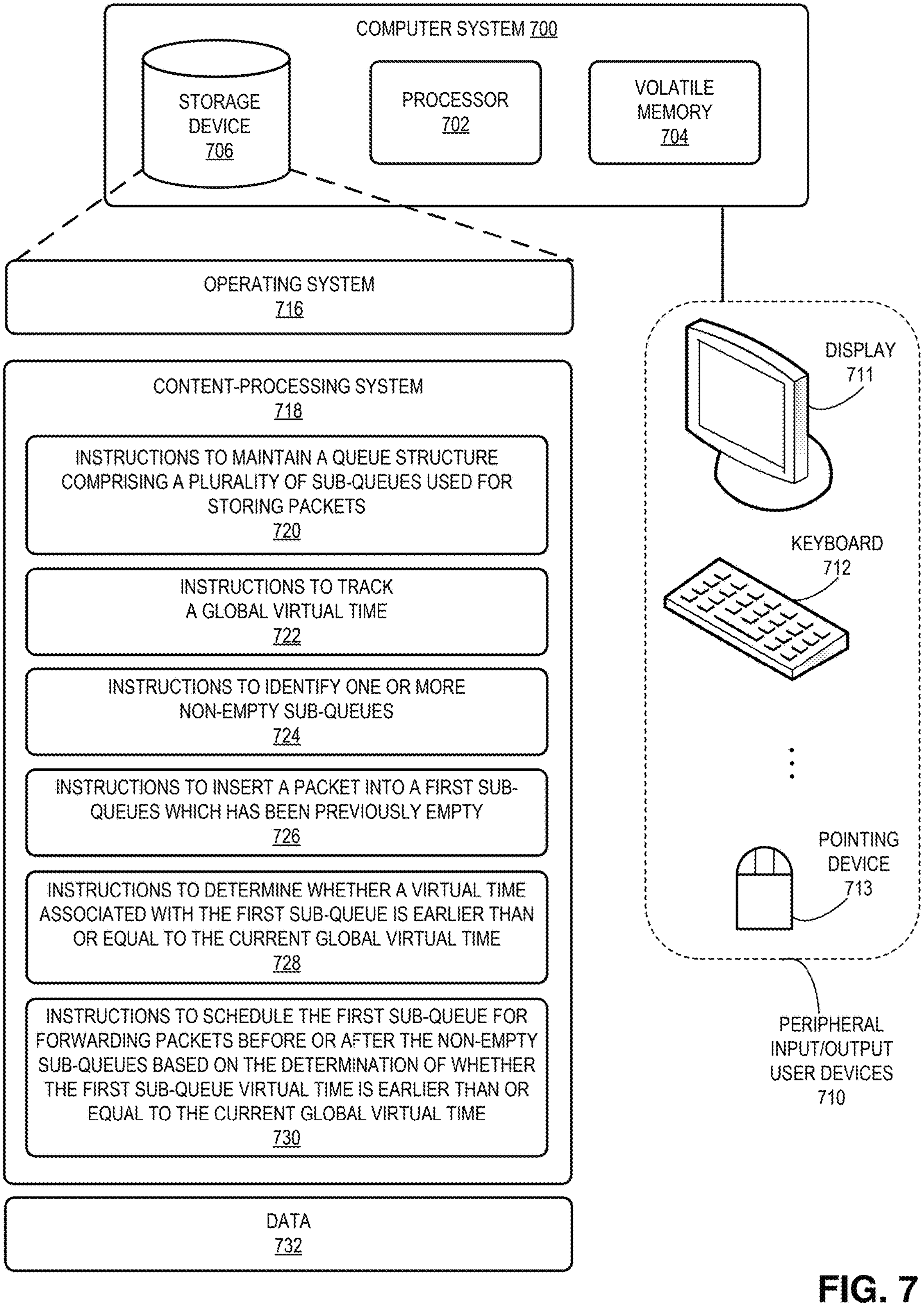
FIG. 7 illustrates a computer system which facilitates handling previously empty sub-queues in an SCRR scheduler, in accordance with an aspect of the present application.

FIG. 7 illustrates a computer system 700 which facilitates handling previously empty sub-queues in an SCRR scheduler, in accordance with an aspect of the present application. Computer system 700 includes a processor 702, a memory 704, and a storage device 706. Memory 704 can include a volatile memory (e.g., RAM) that serves as a managed memory, and can be used to store one or more memory pools. Furthermore, computer system 700 can be coupled to peripheral input/output (I/O) user devices 710 (e.g., a display device 711, a keyboard 712, and a pointing device 713). Storage device 706 can store an operating system 716, content-processing instructions 718, and data 732.

Content-processing instructions 718 can include instructions, which when executed by computer system 700, can cause computer system 700 to perform methods and/or processes described in this disclosure. Specifically, content-processing instructions 718 may include instructions to send and/or receive data to/from other modules/units/components within computer system 700 or to/from other network nodes across a computer network (not shown). Content-processing instructions 718 can further include instructions 720 to maintain a queue structure comprising a plurality of sub-queues used for storing packets, wherein packets in the sub-queues are to be dequeued and forwarded, wherein a respective packet is enqueued into a sub-queue, and wherein a virtual time associated with the respective packet is based on a current sub-queue virtual time corresponding to a previously enqueued packet in the sub-queue, as described above in relation to FIGS. 3 and 4 and operation 602 of FIG. 6A.

Content-processing instructions 718 can also include instructions 722 to track a global virtual time, e.g., based on dequeuing packets from the sub-queues or the virtual time of the packets dequeued from the sub-queues, or completing a scheduling round in which the sub-queues are scheduled by the scheduler, as described above in relation to FIG. 3 and operation 604 of FIG. 6A. Content-processing instructions 718 can include instructions 724 to identify one or more non-empty sub-queues, as described above in relation to lists 420 and 430 of FIG. 4 and operation 606 of FIG. 6A. Content-processing instructions 718 can include instructions 726 to insert a packet into a first sub-queue which has been previously empty, as described above in relation to operation 608 of FIG. 6A.

Content-processing instructions 718 can additionally include instructions 728 to determine whether a virtual time associated with the first sub-queue is earlier than or equal to the current global virtual time, as described above in relation to operation 450 of FIG. 4 and operation 610 of FIG. 6A. Content-processing instructions 718 can include instructions 730 to schedule the first sub-queue for forwarding packets before or after the non-empty sub-queues based on the determination of whether the first sub-queue virtual time is earlier than or equal to the current global virtual time. For example, instructions 730 can be to schedule the first sub-queue for forwarding packets before the non-empty sub-queues in response to the virtual time associated with the first sub-queue being earlier than or equal to the current global virtual time, and to schedule the first sub-queue for forwarding packets after the non-empty sub-queues in response to the virtual time associated with the first sub-queue being later than the current global virtual time.

Data 732 can include any data that is required as input or that is generated as output by the methods and/or processes described in this disclosure. Specifically, data 732 can store at least: data; a packet; a queue structure; a sub-queue; a plurality of sub-queues; a virtual time associated with a packet; a global virtual time; a global virtual time or clock associated with a previous round, a current round, or a next round; an indicator of whether a sub-queue was previously empty; a pool of empty sub-queues; a list of sub-queues; a new list of sub-queues; an old or original list of sub-queues; a result of a comparison of two virtual times; an empty sub-queue; a non-empty sub-queue; an indicator or identifier of a scheduling round; a length of a packet; and an increment by one byte or a packet length.

Content-processing instructions 718 may include more instructions than those shown in FIG. 7. For example, content-processing instructions 718 can also store instructions for executing the operations described above in relation to all versions of No Empty and Initial Advance, as well as: the communications and operations of environment 400 of FIG. 4; sparse flow with Initial Advance 560 of FIG. 5; the operations depicted in flowcharts 600 and 630 of FIGS. 6A and 6B; and the instructions of computer-readable medium 800 in FIG. 8.

While FIG. 7 depicts computer system 700 with units 720-730 which may be implemented in software, the described aspects of the SCRR scheduler are not limited to software and may also be implemented in the hardware of an apparatus or a networking device, such as routers and switches. Such an apparatus can comprise a plurality of units or apparatuses which may communicate with one another via a wired, wireless, quantum light, or electrical communication channel. Such an apparatus may be realized using one or more integrated circuits, and may include fewer or more units or apparatuses than those shown in FIG. 7. Further, such an apparatus may be integrated in a computer system, or realized as a separate device which is capable of communicating with other computer systems and/or devices.

FIG. 8 illustrates a computer-readable medium (CRM) 800 which facilitates handling previously empty sub-queues in an SCRR scheduler, in accordance with an aspect of the present application. CRM 800 can be a non-transitory computer-readable medium or device storing instructions that when executed by a computer or processor cause the computer or processor to perform a method. CRM 800 can store instructions 810 to maintain a queue structure comprising sub-queues used for storing packets to be forwarded. Packets in the sub-queues are to be dequeued and forwarded, a respective packet is enqueued into a sub-queue, and a virtual time associated with the respective packet is based on a current sub-queue virtual time corresponding to a previously enqueued packet in the sub-queue, as described above in relation to FIGS. 1-3.

CRM 800 can also store instructions 812 to track a global virtual time based on dequeuing packets from the sub-queues, e.g., based on the virtual time associated with the packets dequeued from the sub-queues or by advancing the global virtual time in response to completing a scheduling round in which the sub-queues are scheduled by the scheduler, as described above in relation to FIG. 3. CRM 800 can store instructions 814 to identify one or more non-empty sub-queues, as described above in relation to non-empty sub-queues in the list of new sub-queues 420 or the list of old sub-queues 430 of FIG. 4. CRM 800 can store instructions 816 to insert a packet into a first sub-queue which has been previously empty, as described above in relation to operation 450 of FIG. 4.

CRM 800 can further store instructions 818 to determine that a virtual time associated with the first sub-queue is earlier than or equal to the current global virtual time, as described above in relation to 450, 454, and 456 of FIG. 4. CRM 800 can store instructions 820 to schedule the first sub-queue for forwarding packets before the non-empty sub-queues in response to at least one condition, including: a virtual time associated with a most recently dequeued packet from the first sub-queue being earlier than or equal to the global virtual time associated with a previous scheduling round; a virtual time associated with a packet at a head of the first sub-queue being earlier than or equal to the global virtual time associated with a current scheduling round; or a finish time associated with a packet at a tail of the first sub-queue being earlier than or equal to the global virtual time associated with a current scheduling round.

CRM 800 may include more instructions than those shown in FIG. 8. For example, CRM 800 can also store instructions for executing the operations described above in relation to all versions of No Empty and Initial Advance, as well as: the communications and operations of environment 400 of FIG. 4; sparse flow with Initial Advance 560 of FIG. 5; the operations depicted in flowcharts 600 and 630 of FIGS. 6A and 6B; and the instructions of content-processing instructions 718 in FIG. 7.

Aspects of the Instant Application

In general, the disclosed aspects provide a method, computer system, and non-transitory computer-readable storage medium for facilitating handling previously empty sub-queues in a SCRR. In one aspect, the system performs a method. The system maintains, by a computing device, a queue structure comprising a plurality of sub-queues used for storing packets. Packets in the sub-queues are to be dequeued by a scheduler of the computing device. A respective packet is enqueued into a sub-queue. A virtual time associated with the respective packet is based on a current sub-queue virtual time corresponding to a previously enqueued packet in the sub-queue. The system tracks, by the scheduler, a global virtual time based on dequeuing packets from the sub-queues. The system identifies one or more non-empty sub-queues and inserts a packet into a first sub-queue which has been previously empty. The system determines whether a virtual time associated with the first sub-queue is earlier than or equal to the current global virtual time. In response to the virtual time associated with the first sub-queue being earlier than or equal to the current global virtual time, the system schedules the first sub-queue for forwarding packets before the non-empty sub-queues. In response to the virtual time associated with the first sub-queue being later than the current global virtual time, the system schedules the first sub-queue for forwarding packets after the non-empty sub-queues.

In a variation on this aspect, the system schedules the first sub-queue for forwarding packets before the non-empty sub-queues further in response to a virtual time associated with a most recently dequeued packet from the first sub-queue being earlier than or equal to the global virtual time associated with a previous scheduling round.

In a further variation on this aspect, the system schedules the first sub-queue for forwarding packets before the non-empty sub-queues further in response to a virtual time associated with a packet at a head of the first sub-queue being earlier than or equal to the global virtual time associated with a current scheduling round.

In another variation, the system schedules the first sub-queue for forwarding packets before the non-empty sub-queues further in response to a finish time associated with a packet at a tail of the first sub-queue being earlier than or equal to the global virtual time associated with a current scheduling round.

In a further variation, scheduling the first sub-queue for forwarding packets before the non-empty sub-queues comprises adding the first sub-queue at a head of a list of sub-queues to be scheduled, and scheduling the first sub-queue for forwarding packets after the non-empty sub-queues comprises adding the first sub-queue at a tail of the list of sub-queues to be scheduled.

In a further variation, the plurality of sub-queues comprises: a pool of empty or previously empty sub-queues; and the non-empty sub-queues, which comprises a first list of new sub-queues and a second list of original sub-queues, wherein the new sub-queues are to be selected for scheduling by the scheduler before the original sub-queues.

In a further variation, scheduling the first sub-queue for forwarding packets before the non-empty sub-queues comprises adding the first sub-queue at a tail of the first list of new sub-queues, and scheduling the first sub-queue for forwarding packets after the non-empty sub-queues comprises adding the first sub-queue at a tail of the second list of original sub-queues.

In another variation, the system determines that the queue structure comprises only a single non-empty sub-queue for forwarding packets and schedules the single non-empty sub-queue for forwarding packets by adding the single non-empty sub-queue to the first list of new sub-queues.

In a further variation, the system increments by one a length associated with a current scheduling round in response to scheduling the first sub-queue for forwarding packets before the non-empty sub-queues. The system refrains from incrementing by one the length associated with the current scheduling round in response to scheduling the first sub-queue for forwarding packets after the non-empty sub-queues.

In another variation, in response to the virtual time associated with the first sub-queue being earlier than or equal to the global virtual time associated with a previous scheduling round, the system sets a virtual time of the inserted packet based on the global virtual time associated with the previous scheduling round (as described above in relation to Initial Advance).

In a further variation, the system sets the virtual time of the inserted packet further based on the global virtual time associated with the previous scheduling round incremented by one byte.

In a further variation, the system sets the virtual time of the inserted packet further based on the global virtual time associated with the previous scheduling round incremented by one of: a length of the inserted packet; the length of the inserted packet scaled by a first random value; the length of the inserted packet divided by a weight of the first sub-queue; and the length of the inserted packet divided by the weight of the first sub-queue scaled by a second random value.

In a further variation, in response to the virtual time associated with the first sub-queue being later than the global virtual time associated with a previous scheduling round, the system sets a virtual time of the inserted packet based on the virtual time associated with a previous packet in the first sub-queue.

In a further variation, the virtual time associated with the previous packet in the first sub-queue comprises the virtual time associated with the previous packet in the first sub-queue plus a length of the previous packet divided by a weight of the first sub-queue.

In another aspect, a computer system comprises a processor and a storage device which stores instructions that when executed by the processor cause the processor to perform the instructions. The instructions are to maintain a queue structure comprising a plurality of sub-queues used for storing packets, wherein packets in the sub-queues are to be dequeued and forwarded, wherein a respective packet is enqueued into a sub-queue, and wherein a virtual time associated with the respective packet is based on a current sub-queue virtual time corresponding to a previously enqueued packet in the sub-queue. The instructions are further to track a global virtual time based on dequeuing packets from the sub-queues. The instructions are further to identify one or more non-empty sub-queues and insert a packet into a first sub-queue which has been previously empty. The instructions are further to determine whether a virtual time associated with the first sub-queue is earlier than or equal to the current global virtual time. The instructions are further to schedule the first sub-queue for forwarding packets before the non-empty sub-queues in response to the virtual time associated with the first sub-queue being earlier than or equal to the current global virtual time, and to schedule the first sub-queue for forwarding packets after the non-empty sub-queues in response to the virtual time associated with the first sub-queue being later than the current global virtual time. The computer system may include a content-processing system which includes more instructions, e.g., the instructions to perform the operations described herein, including in relation to: the environments of FIGS. 4 and 5; the operations depicted in flowcharts 600 and 630 of FIGS. 6A and 6B; the instructions of content-processing instructions 718 of computer system 700 in FIG. 7; and the instructions of CRM 800 in FIG. 8.

In yet another aspect, a non-transitory computer-readable storage medium stores instructions that when executed by a computer cause the computer to perform the method described above, including in relation to: the environments of FIGS. 4 and 5; the operations depicted in flowcharts 600 and 630 of FIGS. 6A and 6B; the instructions of content-processing instructions 718 of computer system 700 in FIG. 7; and the instructions of CRM 800 in FIG. 8.

The foregoing description is presented to enable any person skilled in the art to make and use the aspects and examples, and is provided in the context of a particular application and its requirements. Various modifications to the disclosed aspects will be readily apparent to those skilled in the art, and the general principles defined herein may be applied to other aspects and applications without departing from the spirit and scope of the present disclosure. Thus, the aspects described herein are not limited to the aspects shown, but are to be accorded the widest scope consistent with the principles and features disclosed herein.

Furthermore, the foregoing descriptions of aspects have been presented for purposes of illustration and description only. They are not intended to be exhaustive or to limit the aspects described herein to the forms disclosed. Accordingly, many modifications and variations will be apparent to practitioners skilled in the art. Additionally, the above disclosure is not intended to limit the aspects described herein. The scope of the aspects described herein is defined by the appended claims.

What is claimed is:

1. A computer-implemented method for scheduling packets to be processed, the method comprising:

maintaining, by a computing device, a queue structure comprising a plurality of sub-queues used for storing packets, wherein packets in the sub-queues are to be dequeued by a scheduler of the computing device, wherein a respective packet is enqueued into a sub-queue, and wherein a virtual time associated with the respective packet is based on a current sub-queue virtual time corresponding to a previously enqueued packet in the sub-queue;

tracking, by the scheduler, a global virtual time based on dequeuing packets from the sub-queues;

identifying one or more non-empty sub-queues;

inserting a packet into a first sub-queue comprising a previously empty sub-queue which was empty immediately prior to the inserting of the packet;

determining whether a virtual time associated with the first sub-queue is earlier than or equal to the global virtual time of a current scheduling round prior to scheduling the first sub-queue into the current scheduling round;

in response to the virtual time associated with the first sub-queue being earlier than or equal to the current global virtual time, scheduling the first sub-queue for forwarding packets before the non-empty sub-queues; and in response to the virtual time associated with the first sub-queue being later than the current global virtual time;

refraining from scheduling the first sub-queue during the current scheduling round; and scheduling the first sub-queue for forwarding packets after the non-empty sub-queues.

2. The method of claim 1, further comprising:

scheduling the first sub-queue for forwarding packets before the non-empty sub-queues further in response to a virtual time associated with a most recently dequeued packet from the first sub-queue being earlier than or equal to the global virtual time associated with a previous scheduling round.

3. The method of claim 1, further comprising:

scheduling the first sub-queue for forwarding packets before the non-empty sub-queues further in response to a virtual time associated with a packet at a head of the first sub-queue being earlier than or equal to the global virtual time associated with a current scheduling round.

4. The method of claim 1, further comprising:

scheduling the first sub-queue for forwarding packets before the non-empty sub-queues further in response to a finish time associated with a packet at a tail of the first sub-queue being earlier than or equal to the global virtual time associated with a current scheduling round.

5. The method of claim 1, wherein scheduling the first sub-queue for forwarding packets before the non-empty sub-queues comprises adding the first sub-queue at a head of a list of sub-queues to be scheduled, and wherein scheduling the first sub-queue for forwarding packets after the non-empty sub-queues comprises adding the first sub-queue at a tail of the list of sub-queues to be scheduled.

6. The method of claim 1, wherein the plurality of sub-queues comprises:

a pool of empty; and the non-empty sub-queues, which comprise a first list of new sub-queues and a second list of original sub-queues and which do not include the empty sub-queues, wherein the new sub-queues optionally include one or more previously empty sub-queues, wherein the new sub-queues are to be selected for scheduling by the scheduler before the original sub-queues.

7. The method of claim 6, wherein scheduling the first sub-queue for forwarding packets before the non-empty sub-queues comprises adding the first sub-queue at a tail of the first list of new sub-queues, and wherein scheduling the first sub-queue for forwarding packets after the non-empty sub-queues comprises adding the first sub-queue at a tail of the second list of original sub-queues.

8. The method of claim 6, further comprising:

determining that the queue structure comprises only a single non-empty sub-queue for forwarding packets; and scheduling the single non-empty sub-queue for forwarding packets by adding the single non-empty sub-queue to the first list of new sub-queues.

9. The method of claim 1, further comprising:

incrementing by one a length associated with a current scheduling round in response to scheduling the first sub-queue for forwarding packets before the non-empty sub-queues; and refraining from incrementing by one the length associated with the current scheduling round in response to scheduling the first sub-queue for forwarding packets after the non-empty sub-queues.

10. The method of claim 1, further comprising:

in response to the virtual time associated with the first sub-queue being earlier than or equal to the global virtual time associated with a previous scheduling round, setting a virtual time of the inserted packet based on the global virtual time associated with the previous scheduling round.

11. The method of claim 10, further comprising:

setting the virtual time of the inserted packet further based on the global virtual time associated with the previous scheduling round incremented by one byte.

12. The method of claim 10, further comprising:

setting the virtual time of the inserted packet further based on the global virtual time associated with the previous scheduling round incremented by one of:

a length of the inserted packet;

the length of the inserted packet scaled by a first random value;

the length of the inserted packet divided by a weight of the first sub-queue; and the length of the inserted packet divided by the weight of the first sub-queue scaled by a second random value.

13. A computer system, comprising:

a processor; and a storage device storing instructions that when executed by the processor cause the processor to perform the instructions to:

maintain a queue structure comprising a plurality of sub-queues used for storing packets, wherein packets in the sub-queues are to be dequeued and forwarded, wherein a respective packet is enqueued into a sub-queue, and wherein a virtual time associated with the respective packet is based on a current sub-queue virtual time corresponding to a previously enqueued packet in the sub-queue;

track a global virtual time based on dequeuing packets from the sub-queues;

identify one or more non-empty sub-queues;

insert a packet into a first sub-queue comprising a previously empty sub-queue which was empty immediately prior to inserting of the packet;

determine whether a virtual time associated with the first sub-queue is earlier than or equal to a current global virtual time of a currently scheduling round prior to scheduling the first sub-queue into the current scheduling round;

schedule the first sub-queue for forwarding packets before the non-empty sub-queues in response to the virtual time associated with the first sub-queue being earlier than or equal to the current global virtual time; and in response to the virtual time associated with the first sub-queue being later than the current global virtual time:

refrain from scheduling the first sub-queue during the current scheduling round; and schedule the first sub-queue for forwarding packets after the non-empty sub-queues.

14. The computer system of claim 13, the instructions further to schedule the first sub-queue for forwarding packets before the non-empty sub-queues further in response to at least one of:

a virtual time associated with a most recently dequeued packet from the first sub-queue being earlier than or equal to the global virtual time associated with a previous scheduling round;

a virtual time associated with a packet at a head of the first sub-queue being earlier than or equal to the global virtual time associated with a current scheduling round; or a finish time associated with a packet at a tail of the first sub-queue being earlier than or equal to the global virtual time associated with a current scheduling round.

15. The computer system of claim 13, wherein the plurality of sub-queues comprises:

a pool of empty or previously empty sub-queues; and the non-empty sub-queues, which comprise a first list of new sub-queues and a second list of original sub-queues and which do not include the empty sub-queues, wherein the new sub-queues optionally include one or more previously empty sub-queues, wherein the new sub-queues are to be selected for scheduling by the scheduler before the original sub-queues; and wherein the instructions are further to:

schedule the first sub-queue for forwarding packets before the non-empty sub-queues by adding the first sub-queue at a tail of the first list of new sub-queues; and schedule the first sub-queue for forwarding packets after the non-empty sub-queues by adding the first sub-queue at a tail of the second list of original sub-queues.

16. The computer system of claim 13, the instructions further to:

in response to the virtual time associated with the first sub-queue being earlier than or equal to the global virtual time associated with a previous scheduling round, set a virtual time of the inserted packet based on the global virtual time associated with the previous scheduling round incremented by one of:

one byte;

a length of the inserted packet;

the length of the inserted packet scaled by a first random value;

the length of the inserted packet divided by a weight of the first sub-queue; and the length of the inserted packet divided by a weight of the first sub-queue scaled by a second random value.

17. A non-transitory computer-readable storage medium storing instructions to:

maintain a queue structure comprising sub-queues used for storing packets to be forwarded, wherein packets in the sub-queues are to be dequeued and forwarded, wherein a respective packet is enqueued into a sub-queue, and wherein a virtual time associated with the respective packet is based on a current sub-queue virtual time corresponding to a previously enqueued packet in the sub-queue;

track a global virtual time based on dequeuing packets from the sub-queues;

identify one or more non-empty sub-queues;

insert a packet into a first sub-queue which has been previously empty;

determine whether a virtual time associated with the first sub-queue is earlier than or equal to a current global virtual time of a current scheduling round prior to scheduling the first sub-queue into the current scheduling round;

schedule the first sub-queue for forwarding packets before the non-empty sub-queues in response to at least one of:

a virtual time associated with a most recently dequeued packet from the first sub-queue being earlier than or equal to the global virtual time associated with a previous scheduling round;

a virtual time associated with a packet at a head of the first sub-queue being earlier than or equal to the global virtual time associated with a current scheduling round; or a finish time associated with a packet at a tail of the first sub-queue being earlier than or equal to the global virtual time associated with a current scheduling round; and in response to the virtual time associated with the first sub-queue being later than the current global virtual time:

refrain from scheduling the first sub-queue during the current scheduling round; and schedule the first sub-queue for forwarding packets after the non-empty sub-queues.

18. The non-transitory computer-readable storage medium of claim 17, wherein the plurality of sub-queues comprises:

a pool of empty or previously empty sub-queues; and the non-empty sub-queues, which comprise a first list of new sub-queues and a second list of original sub-queues and which do not include the empty sub-queues, wherein the new sub-queues optionally include one or more previously empty sub-queues, wherein the new sub-queues are to be selected for scheduling by the scheduler before the original sub-queues; and wherein the instructions are further to:

schedule the first sub-queue for forwarding packets before the non-empty sub-queues by adding the first sub-queue at a tail of the first list of new sub-queues; and schedule the first sub-queue for forwarding packets after the non-empty sub-queues by adding the first sub-queue at a tail of the second list of original sub-queues.

19. The non-transitory computer-readable storage medium of claim 17, the instructions further to:

in response to the virtual time associated with the first sub-queue being earlier than or equal to the global virtual time associated with a previous scheduling round, set a virtual time of the inserted packet based on the global virtual time associated with the previous scheduling round incremented by one byte or by a length of the inserted packet divided by a weight of the first sub-queue.

* * * * *